United States Patent
Broadie et al.

(10) Patent No.: US 12,201,874 B2
(45) Date of Patent: Jan. 21, 2025

(54) SYSTEMS AND METHODS FOR PREDICTING BALL FLIGHT DATA TO CREATE A CONSISTENTLY GAPPED GOLF CLUB SET

(71) Applicant: KARSTEN MANUFACTURING CORPORATION, Phoenix, AZ (US)

(72) Inventors: Christopher M. Broadie, Phoenix, AZ (US); Martin R. Jertson, Phoenix, AZ (US); Paul D. Wood, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 218 days.

(21) Appl. No.: 17/938,320

(22) Filed: Oct. 5, 2022

(65) Prior Publication Data

US 2023/0108761 A1 Apr. 6, 2023

Related U.S. Application Data

(60) Provisional application No. 63/263,222, filed on Oct. 28, 2021, provisional application No. 63/262,128, filed on Oct. 5, 2021.

(51) Int. Cl.
*A63B 24/00* (2006.01)
*A63B 69/36* (2006.01)
*A63B 71/06* (2006.01)

(52) U.S. Cl.
CPC ...... *A63B 24/0021* (2013.01); *A63B 24/0003* (2013.01); *A63B 69/3605* (2020.08);
(Continued)

(58) Field of Classification Search
CPC ............ A63B 24/0021; A63B 69/3605; A63B 24/0003; A63B 69/3658; A63B 71/0622;
(Continued)

(56) References Cited

U.S. PATENT DOCUMENTS 5,056,791 A 10/1991 Poillon
5,342,054 A 8/1994 Chang
(Continued)

FOREIGN PATENT DOCUMENTS

JP H09117534 5/1997
JP H09308710 12/1997
(Continued)

OTHER PUBLICATIONS

Gardiner Golf Simulator Systems, "Fusing Technology With the Art of Golf," May 23, 2006, http://web.archive.org/web/20060523042206/ http://www.golf-simulators.com/physics.htm, pp. 1-13 May 23, 2006.
(Continued)

*Primary Examiner* — Malina D. Blaise

(57) ABSTRACT

A system includes a processor configured for leveraging reference ball flight data associated with an individual and a reference club having a reference loft angle to compute predicted ball flight characteristics for other candidate golf clubs having loft angles different from the reference loft angle. The predicted ball flight characteristics include predicted distances of golf shots the individual is expected to make using the candidate golf clubs that can further accommodate a computed recommendation of optimal loft angles for a consistently gapped golf club set.

20 Claims, 21 Drawing Sheets

(52) U.S. Cl.
CPC ...... *A63B 69/3658* (2013.01); *A63B 71/0622* (2013.01); *A63B 2024/0009* (2013.01); *A63B 2024/0031* (2013.01); *A63B 2024/0034* (2013.01); *A63B 2024/0056* (2013.01); *A63B 2220/20* (2013.01); *A63B 2220/35* (2013.01); *A63B 2220/36* (2013.01); *A63B 2220/833* (2013.01)

(58) Field of Classification Search
CPC .... A63B 2024/0009; A63B 2024/0031; A63B 2024/0034; A63B 2024/0056; A63B 2220/20; A63B 2220/35; A63B 2220/36; A63B 2220/833
See application file for complete search history.

(56) References Cited

U.S. PATENT DOCUMENTS

| | | | |
|---|---|---|---|
| 5,390,927 A | 2/1995 | Angelos | |
| 5,591,091 A | 1/1997 | Hackman | |
| 5,846,139 A | 12/1998 | Bair | |
| 5,951,410 A | 9/1999 | Butler | |
| 6,083,123 A | 7/2000 | Wood | |
| 6,328,660 B1 | 12/2001 | Bunn, III | |
| 6,431,990 B1 | 8/2002 | Manwaring | |
| 6,565,449 B2 | 5/2003 | Buhler | |
| 6,592,465 B2 | 7/2003 | Lutz | |
| 6,602,144 B2 | 8/2003 | Manwaring | |
| 6,672,978 B1 | 1/2004 | Morgan | |
| 6,702,692 B1 | 3/2004 | Smith | |
| 6,719,648 B1 | 4/2004 | Smith | |
| 6,760,685 B2 | 7/2004 | Boehm | |
| 6,929,558 B2 | 8/2005 | Manwaring | |
| 6,966,843 B2 | 11/2005 | Rankin | |
| 7,041,014 B2 | 5/2006 | Wright | |
| 7,147,570 B2 | 12/2006 | Toulon | |
| 7,153,215 B2 | 12/2006 | Peterson | |
| 7,159,451 B2 | 1/2007 | McGann | |
| 7,166,035 B2 | 1/2007 | Voges | |
| 7,273,427 B2 | 9/2007 | Inoue | |
| 7,300,356 B2 | 11/2007 | Nishino | |
| 7,369,158 B2 | 5/2008 | Gobush | |
| 7,377,862 B2 | 5/2008 | Galloway | |
| 7,395,696 B2 | 7/2008 | Bissonnette | |
| 7,499,828 B2 | 3/2009 | Barton | |
| 7,540,500 B2 | 6/2009 | Kiraly | |
| 7,837,572 B2 | 11/2010 | Bissonnette | |
| 7,946,960 B2 | 5/2011 | Vitolo | |
| 7,959,521 B2 * | 6/2011 | Nusbaum | A63B 69/362 473/278 |
| 7,967,695 B2 | 6/2011 | Voges | |
| 8,360,899 B2 | 1/2013 | Swartz | |
| 8,371,962 B2 * | 2/2013 | Solheim | A63B 24/0021 473/409 |
| 8,398,508 B2 | 3/2013 | Logitti, III | |
| 8,409,024 B2 | 4/2013 | Marty | |
| 8,444,509 B2 | 5/2013 | Swartz | |
| 8,500,568 B2 | 8/2013 | Bissonnette | |
| 8,512,162 B2 | 8/2013 | Kim | |
| 8,556,267 B2 | 10/2013 | Gobush | |
| 8,622,845 B2 | 1/2014 | Bissonnette | |
| 8,808,105 B2 | 8/2014 | Margoles | |
| 8,821,306 B2 | 9/2014 | Margoles | |
| 8,845,451 B2 | 9/2014 | Margoles | |
| 9,452,331 B2 | 9/2016 | Okazaki | |
| 9,463,366 B2 | 10/2016 | Kamino | |
| 9,675,862 B2 * | 6/2017 | Solheim | A63B 24/0003 |
| 9,827,464 B2 | 11/2017 | Swartz | |
| 10,799,759 B2 | 10/2020 | Hixenbaugh | |
| 10,806,979 B2 * | 10/2020 | Kimizuka | A63B 24/0006 |
| 10,856,744 B2 * | 12/2020 | Yuen | G01C 22/006 |
| 2003/0008731 A1 | 1/2003 | Anderson | |
| 2004/0127303 A1 | 7/2004 | Teraoka | |
| 2005/0215338 A1 | 9/2005 | Miyamoto | |
| 2007/0015611 A1 * | 1/2007 | Noble | A61B 5/1126 473/450 |
| 2007/0049393 A1 | 3/2007 | Gobush | |
| 2007/0167247 A1 | 7/2007 | Lindsay | |
| 2007/0238539 A1 | 10/2007 | Dawe | |
| 2008/0020867 A1 | 1/2008 | Manwaring | |
| 2009/0326688 A1 | 12/2009 | Thomas | |
| 2010/0151956 A1 | 6/2010 | Swartz | |
| 2012/0236030 A1 * | 9/2012 | Border | G06F 3/013 345/633 |
| 2013/0040751 A1 * | 2/2013 | Wise | A63B 60/00 473/409 |
| 2013/0053190 A1 * | 2/2013 | Mettler | A63B 24/0062 473/422 |
| 2013/0266918 A1 * | 10/2013 | Tinjust | A63B 24/0087 700/91 |
| 2014/0139454 A1 * | 5/2014 | Mistry | G06F 3/017 345/173 |
| 2014/0143784 A1 * | 5/2014 | Mistry | G06F 3/0488 718/102 |
| 2014/0200091 A1 * | 7/2014 | Swartz | A63B 71/0619 473/221 |
| 2015/0317910 A1 * | 11/2015 | Daniels | G09B 9/00 434/257 |
| 2017/0007902 A1 * | 1/2017 | Cottam | G16H 40/63 |
| 2017/0061817 A1 * | 3/2017 | Mettler May | A61B 5/1124 |
| 2017/0239522 A1 | 8/2017 | Voges | |
| 2017/0332946 A1 * | 11/2017 | Kikkeri | A61B 5/1116 |
| 2018/0104573 A1 * | 4/2018 | Jeffery | G06F 3/017 |
| 2019/0371028 A1 * | 12/2019 | Harrises | G06T 11/60 |
| 2020/0193864 A1 * | 6/2020 | Fang | A63B 60/46 |
| 2023/0072423 A1 * | 3/2023 | Osborn | G16H 20/30 |
| 2023/0256312 A1 | 8/2023 | Johnson | |

FOREIGN PATENT DOCUMENTS

| | | |
|---|---|---|
| JP | 2002119621 | 9/2002 |
| JP | 2003042716 | 2/2003 |
| JP | 2003199859 | 7/2003 |
| JP | 2004135908 | 7/2004 |
| JP | 2006031430 | 2/2006 |
| JP | 2006247023 | 9/2006 |
| JP | 2001145718 | 5/2021 |

OTHER PUBLICATIONS

International Search Report/Written Opinion for Int'l Patent Application No. PCT/US2022/077631, filed on Jan. 6, 2023.

* cited by examiner

| SET OF REFERENCE BALL FLIGHT DATA 120 | | | | |
|---|---|---|---|---|
| FIRST HIT | BALL SPEED VALUE | LAUNCH ANGLE | SPIN RATE | CARRY DISTANCE | TOTAL DISTANCE |
| SECOND HIT | BALL SPEED VALUE | LAUNCH ANGLE | SPIN RATE | CARRY DISTANCE | TOTAL DISTANCE |
| [...] | [...] | [...] | [...] | | |
| $n^{th}$ HIT | BALL SPEED VALUE | LAUNCH ANGLE | SPIN RATE | CARRY DISTANCE | TOTAL DISTANCE |
| SET OF REFERENCE BALL FLIGHT CHARACTERISTICS 130 | NORMALIZED BALL SPEED VALUE | NORMALIZED LAUNCH ANGLE | NORMALIZED SPIN RATE | NORMALIZED CARRY DISTANCE | NORMALIZED TOTAL DISTANCE |

FIG. 3

SET GAPPING TOOL

| Testing Conditions | Advanced Options |

Tested Golf Ball Model
[ Select Golf Ball ▽ ]

Playing Golf Ball Model
[ Select Golf Ball ▽ ]

Typical Playing Temperature, F
40      [85]      120
    40 50 60 70 80 90 100 110 120

Typical Playing Altitude, ft
40 [1000]       7000
    0 1000 2000 3000 4000 5000 6000 7000

Bounce and Roll Firmness
⊙ Firm
○ Medium
○ Soft

[ ⊲ Create Gapping Report ]

*FIG. 14*

SYSTEMS AND METHODS FOR PREDICTING BALL FLIGHT DATA TO CREATE A CONSISTENTLY GAPPED GOLF CLUB SET

CROSS REFERENCE PRIORITIES

This claims the benefit of U.S. Provisional Application No. 63/262,128, filed Oct. 5, 2021; and U.S. Provisional Application No. 63/263,222, filed Oct. 28, 2021, all of which is incorporated herein by reference.

TECHNICAL FIELD

The present disclosure relates to computing and tracking technologies for computer-implemented golf shot analysis and optimal club selection; and more particularly, to a tracking system and computer-implemented ball flight prediction system that utilizes ball flight data from a reference club to predict ball flight data of a plurality of candidate clubs for a golf club set.

BACKGROUND

The typical golf club set comprises a plurality of golf clubs (i.e., a driver, fairway woods, hybrids, irons, and/or wedges), wherein each of the plurality of golf clubs comprises a club head with a unique loft angle. The different loft angles allow each of the golf clubs to hit a golf ball a different distance. The process of optimizing the distance of each club within the set is called "set gapping." Proper set gapping provides a golf club set wherein when faced with a golf shot of any distance, the golfer is able to select a club from the set that he or she knows will travel within a few yards of the desired distance. Typically, the loft angle of each club is selected during a fitting session to provide consistent gapping throughout the set. However, technology is lacking with respect to computed prediction of golf set combinations that efficiently optimize gapping for an individual player. In addition, it is not practical for a golfer to hit every single combination of club heads with different loft angles and measure the shot distance of each during a fitting session to achieve consistent gapping, as this is a very time-consuming process.

Accordingly, there is a technical need in the art for improved computed ball flight prediction technology that can accurately and efficiently predict the shot distance of different club heads for a specific individual and recommend particular loft angles for each club head for the individual in order to achieve consistent set gapping. Further, there is a need to accurately predict the shot distance of an entire set by measuring the ball flight of a single club. In doing so, club sets can be properly gapped during a fitting session without the player needing to hit shots with a club head of every available loft angle.

SUMMARY

Aspects of the present disclosure may take the form of a computer-implemented system comprising a tracking device and a processor in operable communication with the tracking device. The tracking device generates a first dataset unique to an individual for each of a plurality of golf shots struck by the individual using a reference golf club comprising a reference loft angle, the first dataset including reference ball flight characteristics associated with movement of a golf ball. The processor is configured to transform the first dataset to a second dataset defining predicted ball flight characteristics for one or more candidate golf clubs. Specifically, the processor normalizes the reference ball flight characteristics defined by the first dataset as derived from the plurality of golf shots, generates a set of predicted ball flight characteristics for a candidate loft angle by input of the reference ball flight characteristics as normalized and the candidate loft angle to a predetermined ball flight trend function configured to predict changes in ball flight based upon predetermined correlations between loft angle and the ball flight characteristics, and adjusts the set of predicted ball flight characteristics by application of output from one or more adjustment computations that adjust for deviation of one or more of the reference ball flight characteristics of the individual from a predetermined threshold, the one or more adjustment computations improving computed-prediction accuracy by accounting for player-specific discrepancies. In some embodiments, the one or more adjustment computations include a ball speed adjustment component and a spin rate adjustment component that account for an effect on each predicted ball flight characteristic due to a deviation from a baseline ball speed value for the reference club and a baseline spin rate value for the reference club, respectively.

Aspects of the present disclosure may further take the form of a method comprising steps of: accessing, by a processor, data associated with the ball flight characteristics of a plurality of golf club shots struck by an individual using a reference club defining a reference club loft angle, the dataset including, for each of the plurality of golf shots, ball speed, launch angle, spin rate, club head speed, apex height, carry distance, and/or total distance; applying by the processor a ball flight trend function to an average of each ball flight characteristic in the dataset to produce a set of general ball flight predictions for a plurality of candidate clubs each defining candidate loft angle; applying by the processor one or more ball flight characteristics adjustments to each of the ball flight predictions to produce a set of adjusted ball flight predictions for the plurality of candidate clubs; and generating a recommendation of a combination of the plurality of candidate clubs (recommended clubs) that produces a minimal variation in gaps between predicted distances associated with each recommended club.

Aspects of the present disclosure may further take the form of a computer-readable medium comprising instructions executed by a processor to perform operations, including: accessing, by a processor, data associated with the ball flight characteristics of a plurality of golf club shots struck by an individual using a reference club defining a reference club loft angle, the dataset including, for each of the plurality of golf shots, ball speed, launch angle, spin rate, club head speed, apex height, carry distance, and/or total distance; applying by the processor a ball flight trend function to an average of each ball flight characteristic in the dataset to product a set of general ball flight predictions for a plurality of candidate clubs each defining candidate loft angle; applying by the processor one or more ball flight characteristics adjustments to each of the ball flight predictions to produce a set of adjusted ball flight predictions for the plurality of candidate clubs; determining a target gap, the target gap being a desired average gap between distances predicted for the candidate clubs; and generating a recommendation of a combination of the candidate clubs (recommended clubs) with candidate club loft angles that produces an average gap between the predicted distances of the recommended clubs that is closest to the target gap.

The foregoing examples broadly outline various aspects, features, and technical advantages of examples according to the disclosure in order that the detailed description that follows may be better understood. It is further appreciated that the above operations described in the context of the illustrative example method, device, and computer-readable medium are not required and that one or more operations may be excluded and/or other additional operations discussed herein may be included. Additional features and advantages will be described hereinafter. The conception and specific examples illustrated and described herein may be readily utilized as a basis for modifying or designing other structures for carrying out the same purposes of the present disclosure. Such equivalent constructions do not depart from the spirit and scope of the appended claims.

BRIEF DESCRIPTION OF THE DRAWINGS

This disclosure relates to computing and tracking technologies for computer-implemented golf shot analysis and optimal club selection

FIG. 3 is an illustration of normalization associated with the set of reference ball flight characteristics data described in FIG. 1A.

FIG. 14 is another screenshot of an exemplary user interface (UI) for providing further non-limiting details of the system described herein.

Figure 1A:
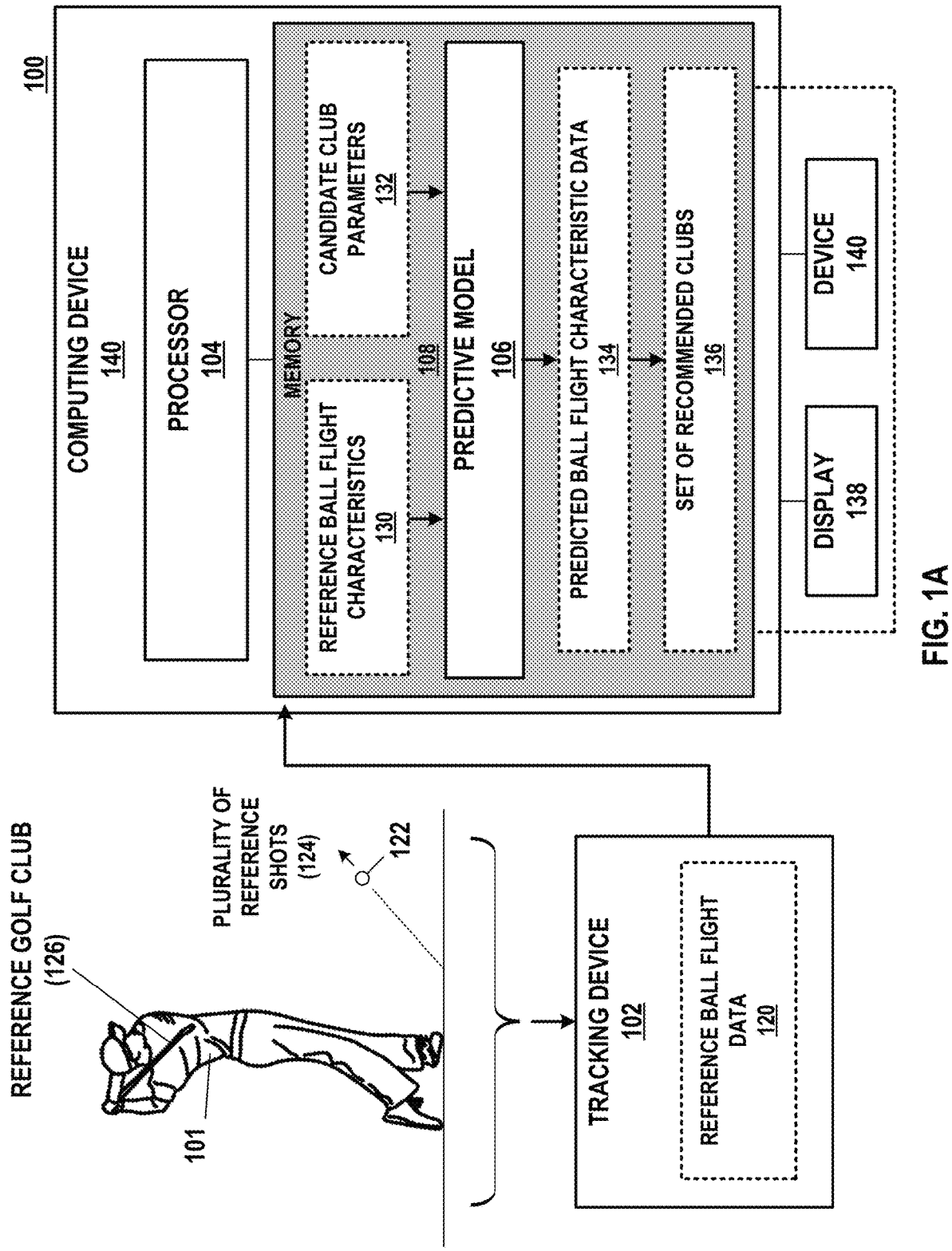
FIG. 1A is a diagram of a computer-implemented system for generating reference ball flight data from a plurality of golf shots stuck by a golfer with a reference club using a tracking device, and a processor (of a computing device or otherwise) that applies the reference ball flight data to a predictive model to generate predicted ball flight characteristics for a plurality of candidate clubs and a recommended golf club set that optimizes gapping.

Other aspects of the disclosure will become apparent by consideration of the detailed description and accompanying drawings.

DESCRIPTION

Aspects of the present disclosure relate to a computer-implemented system and associated methods for measuring reference ball flight data for an individual striking a reference golf club having a reference loft angle; and leveraging the reference ball flight data to compute predicted ball flight characteristics for other candidate golf clubs having loft angles different from the reference loft angle (without the need to measure ball flight data for the individual using the candidate golf clubs). The predicted ball flight characteristics may include predicted distances of golf shots the individual is expected to make using the candidate golf clubs that can further accommodate a computed recommendation of optimal loft angles for a golf club set with consistent or predefined gapping targets.

The system records measured ball flight data from a single club hit by a player and transforms said data into predictions for said player's ball flight characteristics for an entire club set. The system applies general ball flight trends and factors in player-specific adjustments to arrive at an accurate prediction. The general ball flight trends are derived from a large sample of player test data. The player-specific adjustments correspond to deviations between the player's measured data and average values certain ball flight characteristics such as ball speed and spin rate.

More specifically, the system can include a tracking device that measures and records reference ball flight data corresponding to a set of golf shots struck by a reference club (e.g., one of the clubs in the set, preferably a mid-iron such as a 7-iron) and can further include (one or more of) a processor or processing element executing a predictive model that leverages the reference ball flight data to generate a prediction, or set of predictive ball flight characteristics for the ball flight of other potential candidate clubs in a set (e.g., other mid-irons, short-irons, long-irons, hybrids, and/or fairway woods) based on the individual-specific ball flight information derived from the golf shots by the reference club (reference ball flight data). For instance, parameters associated with candidate clubs (such as a candidate club loft angle) can be applied to the prediction model along with the individual-specific reference ball flight data, and the processor executing the predictive model can utilize such inputs to output predicted ball flight characteristics data for one or more candidate clubs. In some examples, the predictive model further includes one or more player-specific adjustment computations that can adjust the predicted ball flight characteristics data to account for player-specific deviations from predetermined player performance thresholds.

In addition, the processor can further output a set of "recommended clubs" selected from a plurality of candidate clubs, each having a "recommended loft angle" that collectively optimize gapping for the individual. As such, the system can recommend, choose, or otherwise identify a recommended combination or set of clubs from the plurality of candidate clubs based on various computations (predetermined and defined by the predictive model) that feature an optimal combination of predicted loft angles for every club in the set to optimize the gapping of the set. The system can optimize gapping of the set of recommended clubs by selecting golf clubs that collectively result in the smallest predicted variation of each gap between adjacent clubs as described herein. In some examples the system can optimize gapping of the set of recommended clubs by selecting golf clubs from the candidate clubs that collectively result in gaps that meet certain criteria specified by the individual.

The term or phrase "reference golf club," "reference club," "example golf club," or "example club" used herein can be defined as a physical golf club used by a player to strike a plurality of reference golf shots that the tracking device measures to generate reference ball flight data. The reference ball flight data includes ball flight characteristics (ball speed, spin rate, launch angle, height, apex, carry distance, total distance, etc.) that are measured, recorded, and normalized to determine individual-specific ball flight tendencies of the player. The reference club can be any club in a golf club set including any wood-type, hybrid-type, or iron-type golf club.

The term or phrase "candidate club" or "candidate golf club" as used herein can be defined as a possible golf club for use by the individual as part of a club set combination to optimize gapping for the club set combination. The predictive model utilizes parameters of the candidate club among other information to compute predicted ball flight characteristics associated with the candidate club for the individual. The predicted ball flight characteristics for a given candidate club can include a predicted spin rate, a predicted launch angle, a predicted ball speed, a predicted total distance, and/or a predicted carry distance.

The term or phrase "recommended club" or "recommended golf club" as used herein can be defined as a selected candidate club that the system identifies as being optimal for producing a total "set of recommended clubs" with loft angle combinations that optimizes gapping. A given recommended club, being one of a plurality of candidate clubs, defines a particular loft angle and predicted ball flight characteristics generated in the manner as described herein. The set of predicted ball flight characteristic data for a given recommended club can include a predicted spin rate, a predicted launch angle, a predicted ball speed, a predicted total distance, and/or a predicted carry distance (note that these characteristics can be predicted for each candidate club prior to selection of one or more candidate clubs as recommended clubs).

In general, the system, executing the predictive model, generates a set of predicted ball flight characteristics data corresponding to a plurality of candidate clubs based on individual-specific ball flight data generated from a reference club, and can further select a unique combination of the candidate clubs as a plurality of recommended golf clubs that optimize gapping for the individual. To clarify, each recommended club is a selected candidate club and theoretical golf club for an individual to include in his/her golf bag whose ball flight characteristics are simulated based on measured and recorded ball flight characteristic data of the reference club as applied to the predictive model. For example, the reference club can be a 7-iron (e.g., an iron-type golf club head having a (reference) loft angle of approximately between 25 degrees and 35 degrees). A player can strike a plurality of golf shots with the 7-iron, and the system can record reference ball flight data including reference ball flight characteristics (e.g., ball speed, spin rate, launch angle, carry distance, total distance, etc.) from each of the plurality of golf shots with the 7-iron. The system can then generate, by execution of the predictive model, a set of corresponding predicted ball flight characteristics for any other candidate clubs (e.g., 3-iron, 4-iron, 5-iron, 6-iron, 8-iron, 9-iron, and any fairway woods, hybrids, and/or wedges). For each recommended golf club selected from candidate clubs, a set of predicted ball flight characteristics associated with a particular loft angle can be generated. As such, the system can create predictions for a plurality of different candidate clubs with various loft angles. By comparing the predicted ball flight characteristics associated with each candidate club, the computing system recommends (from a set of candidate clubs) an optimal combination of recommended clubs according to which combination is predicted to produce the golf club set with the most consistent gapping (i.e., the most consistent or desirable variation in gaps between the distance of each recommended club). By this method, an optimal combination of clubs for an individual to use in his or her golf club set is predicted without the individual having to hit every single club during a fitting session.

Referring to FIG. 1A, an example computer-implemented system, designated system 100 is shown that predicts ball flight data for an individual 101 with improved computed prediction functionality and can further select or recommend a golf club set that provides consistent gapping for the individual. In general, as indicated, the system 100 includes a tracking device 102 and at least one processor 104 or processing element which may be implemented as part of a computing device (e.g., computing device 140), cloud environment, or the like. As indicated, the processor 104 executes a predictive model 106 stored in a memory 108 or otherwise stored that can define or be embodied as code and/or machine-executable instructions executable by the processor 104 and may represent one or more of a procedure, a function, a subprogram, a program, a routine, a subroutine, a module, an object, a software package, a class, or any combination of instructions, data structures, or program statements, and the like. In other words, aspects of the computed ball flight characteristics prediction functionality described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) of the predictive model 106 may be stored in a computer-readable or machine-readable medium such as the memory 108, and the processor 104 performs the tasks defined by the code. Accordingly, the predictive model 106 as executed by the processor 104 configures the processor 104 for computed ball flight characteristics prediction according to and/or defining various functions and functionality as described herein.

In general, the tracking device generates a first dataset defining reference ball flight data 120 by, e.g., measuring characteristics associated with movement of a plurality of golf balls 122 as the individual 101 completes a plurality of reference shots 124 with the golf balls 122 using a reference club 126. By non-limiting examples, the reference ball flight data 120 may include reference ball flight characteristics (of the golf ball 122) such as ball speed, spin rate, launch angle, height, apex, carry distance, total distance, or other metrics measured by the tracking device 102 for each of the plurality of reference shots 124 with the reference club 126. In some examples, the reference club 126 is a 7-iron (e.g., an iron-type golf club head having a (reference) loft angle of approximately between 25 degrees and 35 degrees), but the tracking device 102 can generate the reference ball flight data 120 using any type and loft angle of club the individual 101 selects for the reference club 126. The tracking device 102 may generate the first dataset to include reference ball flight data 120 for any number of shots the individual 101 strikes with the reference club 126.

Figures 2A, 2B, 2C:
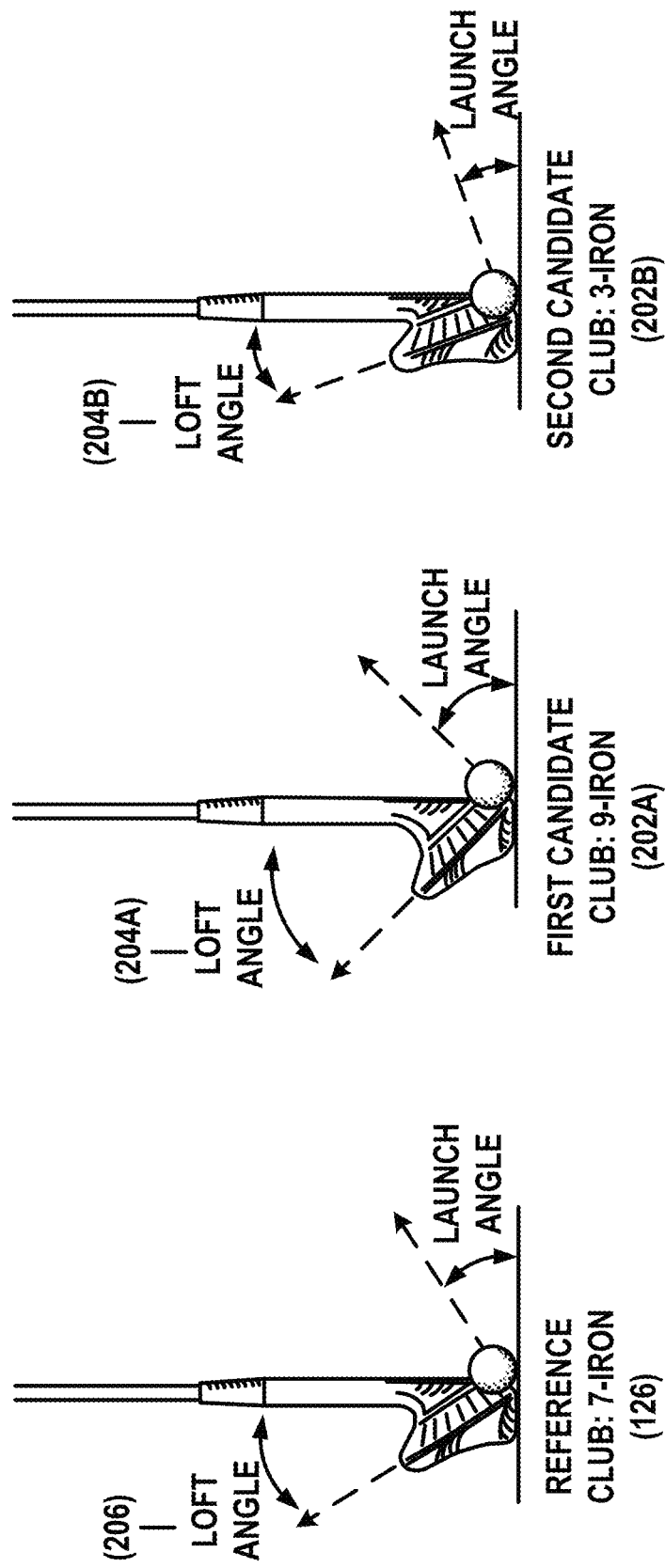
FIGS. 2A-2C are illustrations of launch angles and loft angles for various candidate clubs as referenced herein.
Figure 2D:
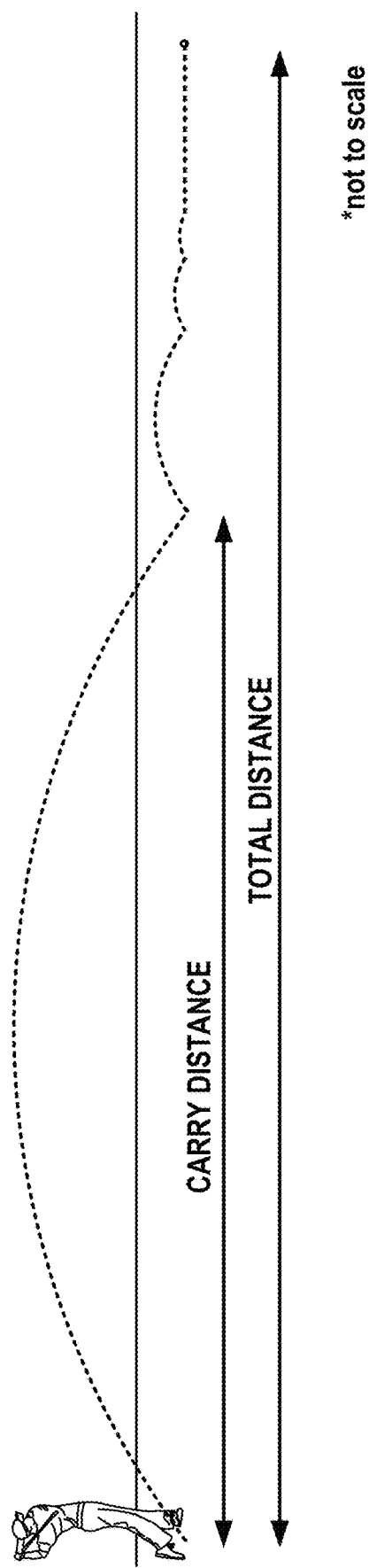
FIG. 2D is an illustration of carry and total distance for the reference club shots and/or predictions for candidate clubs used to optimize gapping.

The processor 104 accesses the reference ball flight data 120 and executes the predictive model 106 to transform the reference ball flight data 120 to a second dataset defining predicted ball flight characteristics 134 for one or more candidate clubs. More particularly, in some examples, the reference ball flight data 120 is normalized or otherwise preprocessed to derive a set of reference ball flight characteristics 130. The processor 104 then derives predicted ball flight characteristics 134 for each of a plurality of candidate clubs (202 in FIGS. 2B-2C) by application of a ball flight trend function and can apply one or more adjustment computations defined by the predictive model 106 in view of inputs including the set of reference ball flight characteristics 130 and one or more candidate club parameters 132 (e.g., a loft angle value of each candidate club), as further described herein. FIGS. 2A-2C illustrate a general example comparing the reference club 126 to candidate clubs 202; designated first candidate club 202A, and second candidate club 202B. In the example shown, the predictive model 106 leverages candidate club parameters 132 including a first loft angle 204A defined by the first candidate club 202A, and a second loft angle 204B defined by the second candidate club 202B to derive the predicted ball flight characteristics 134 including predicted ball flight characteristics for the first candidate club 202A and the second candidate club 202B, respectively. In this example, the predicted ball flight characteristics 134 can include a predicted carry distance and/or total distance (illustrated in FIG. 2D) that the individual 101 would likely hit a golf ball using the first candidate club 202A and the second candidate club 202B. In addition, as indicated in FIG. 1A, the predicted ball flight characteristics 134 can be utilized to generate a set of recommended clubs 136 for the individual 101 that optimizes gapping, or provides other utility, as further described herein.

It would be appreciated that the memory 108 can store the first dataset obtained by the tracking device 102 (including the reference ball flight characteristics 130) and the second dataset generated by the processor 104 executing the predictive model 106, any data used to execute and/or tune the ball flight trend function (such as baseline ball speed, baseline spin rate, and adjustment parameters) defined by the predictive model 106, as well as any data pertaining to the candidate clubs 202 such as the candidate loft angles and the set of predicted ball flight characteristics 134 associated with each candidate club. Further, the system 100 can include a display device 138 in communication with the processor 104 that displays information associated with any of the data described herein, and information associated with any of the foregoing can be transmitted or otherwise made accessible to other computing devices (e.g., device 140).

Figure 9:
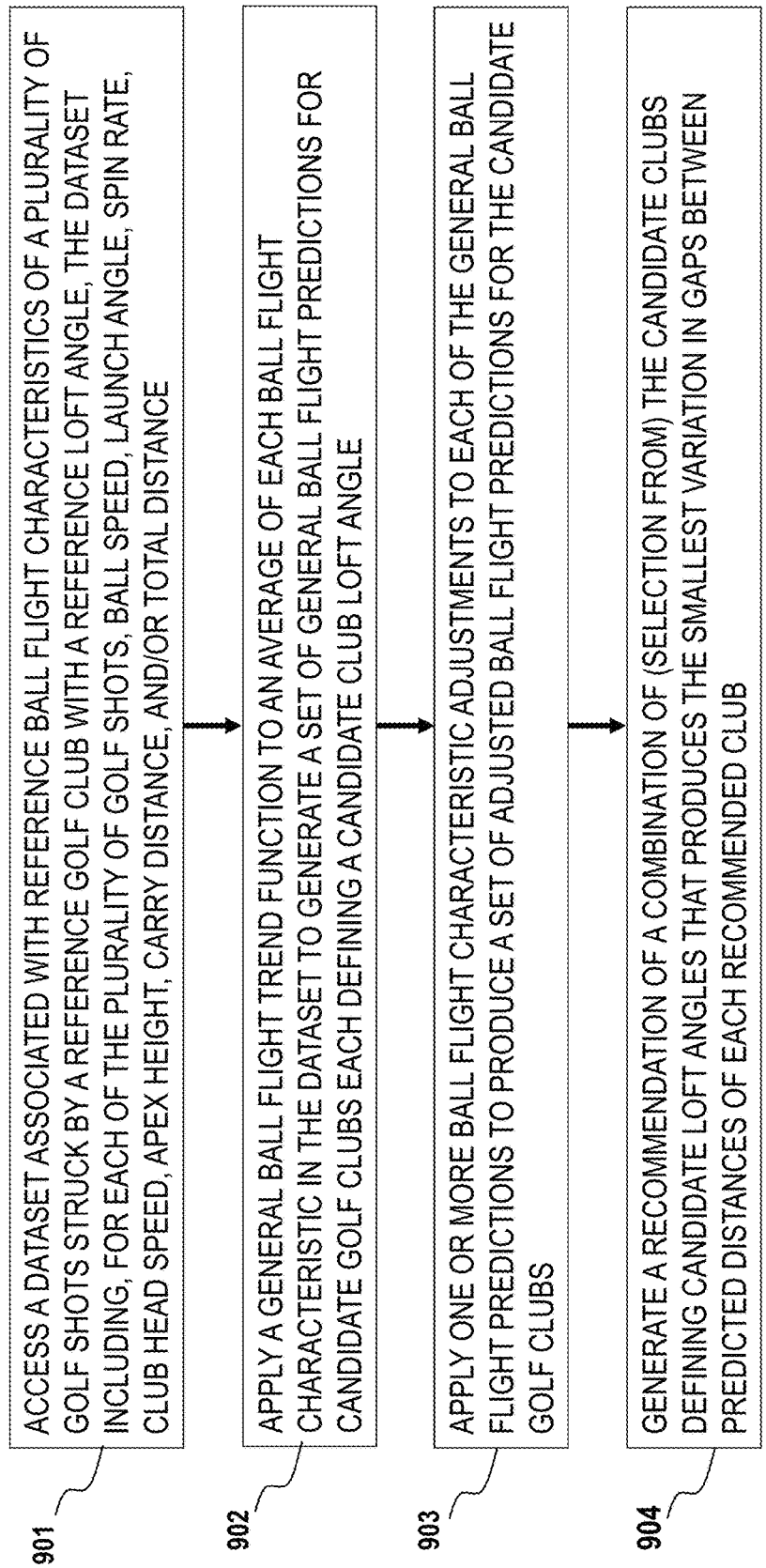
FIG. 9 illustrates a process flow diagram representing one process for implementing the system of FIG. 1A to generate a recommendation for a predicted club set wherein the variation in the gap between each predicted distance is minimized

Referring now to a process flow diagram of FIG. 9, one method 900 of implementing or otherwise illustrating aspects of the system 100 shall now be described. Referring to block 901, in many examples, the processor 104 accesses the reference ball flight data 120 generated by the tracking device 102 as described herein, and normalizes the data (e.g., takes an average of each ball flight characteristic available) to prepare the reference ball flight characteristics 130. In some examples of this step, as shown in FIG. 3, the processor 104 can generate the reference ball flight characteristics 130 that are specific to the individual 101, including a normalized ball speed value 231, a normalized launch angle value 232, a normalized spin rate value 233, a normalized carry distance 234, a normalized total distance 235, and/or a normalized apex height from the set of reference ball flight data 120. Such normalized values are used to characterize the overall ball flight associated with the reference loft angle (206 in FIG. 2A) of the reference club 126 for the individual 101. In other examples, the processor 104 accesses the reference ball flight characteristics 130 that are specific to the individual 101, including the normalized ball speed value 231, the normalized launch angle value 232, the normalized spin rate value 233, the normalized carry distance 234, the normalized total distance 235, and/or the normalized apex height, where the reference ball flight characteristics 130 are already normalized prior to retrieval by the processor 104. The processor 104 can apply the following functions and processes with respect to the normalized values to any ball flight characteristic of the reference ball flight characteristics 130. The predictions generated by the processor 104 for various candidate clubs 202 can be predictions of the average ball flight characteristics associated with different candidate loft angles 204 of candidate clubs 202 that may be selected for the individual 101. In this way, the set of recommended clubs 136 the system 100 produces as an optimal combination of clubs in a set is likely to be accurate and correlate to high performance in the field for the individual 101.

General Ball Flight Trend

Figure 1B:
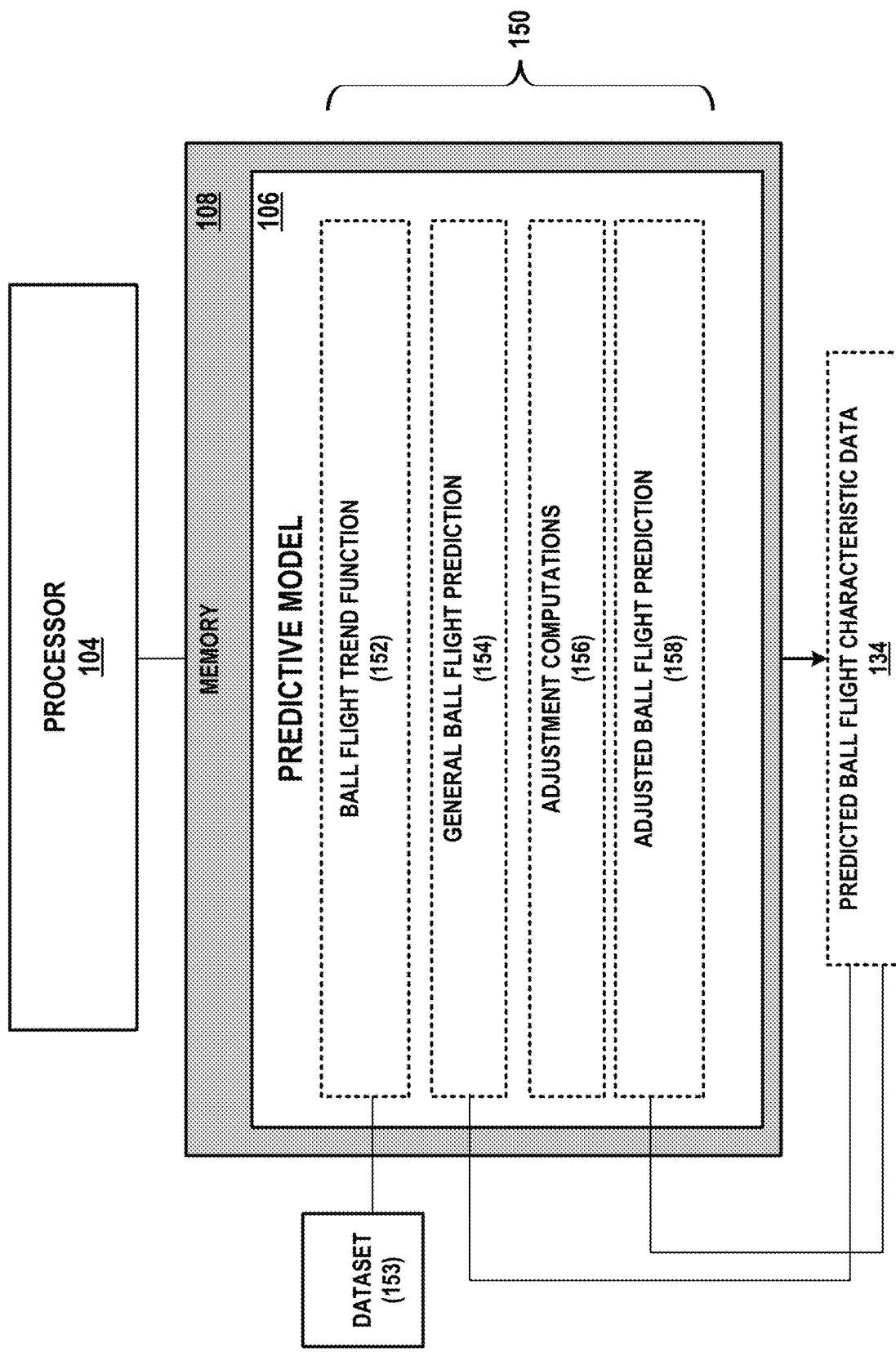
FIG. 1B is a simplified block diagram illustrating additional aspects of the predictive model executed by the processor introduced in FIG. 1A to compute the predicted ball flight characteristic data for candidate clubs.

As shown in FIG. 1B, the processor 104 applies a ball flight prediction process 150 defined by the predictive model 106 to the reference ball flight characteristics 130 (that is generated from the tracking device 102 measuring the plurality of reference shots 124 when the individual 101 hits the plurality of golf balls 122 using the reference club 126) to generate the set of predicted ball flight characteristics 134 for the candidate clubs 202. Referring to block 902, the processor 104, applying a ball flight trend function 152 defined by the predictive model 106, first transforms the reference ball flight characteristics 130 to a general ball flight prediction 154 for each candidate club 202 (e.g., an "overall trend" component of one or more predicted ball flight characteristics). The ball flight trend function 152 is a predetermined function derived from observed relationships between club head loft angle and ball flight characteristics (e.g., ball speed, spin rate, and launch angle) of different clubs within a set and known/historical ball flight data from a ground truth dataset or corpus (e.g., dataset 153), and is configured to predict changes in ball flight based on such observed and/or known relationships and historical data.

Figure 4A:
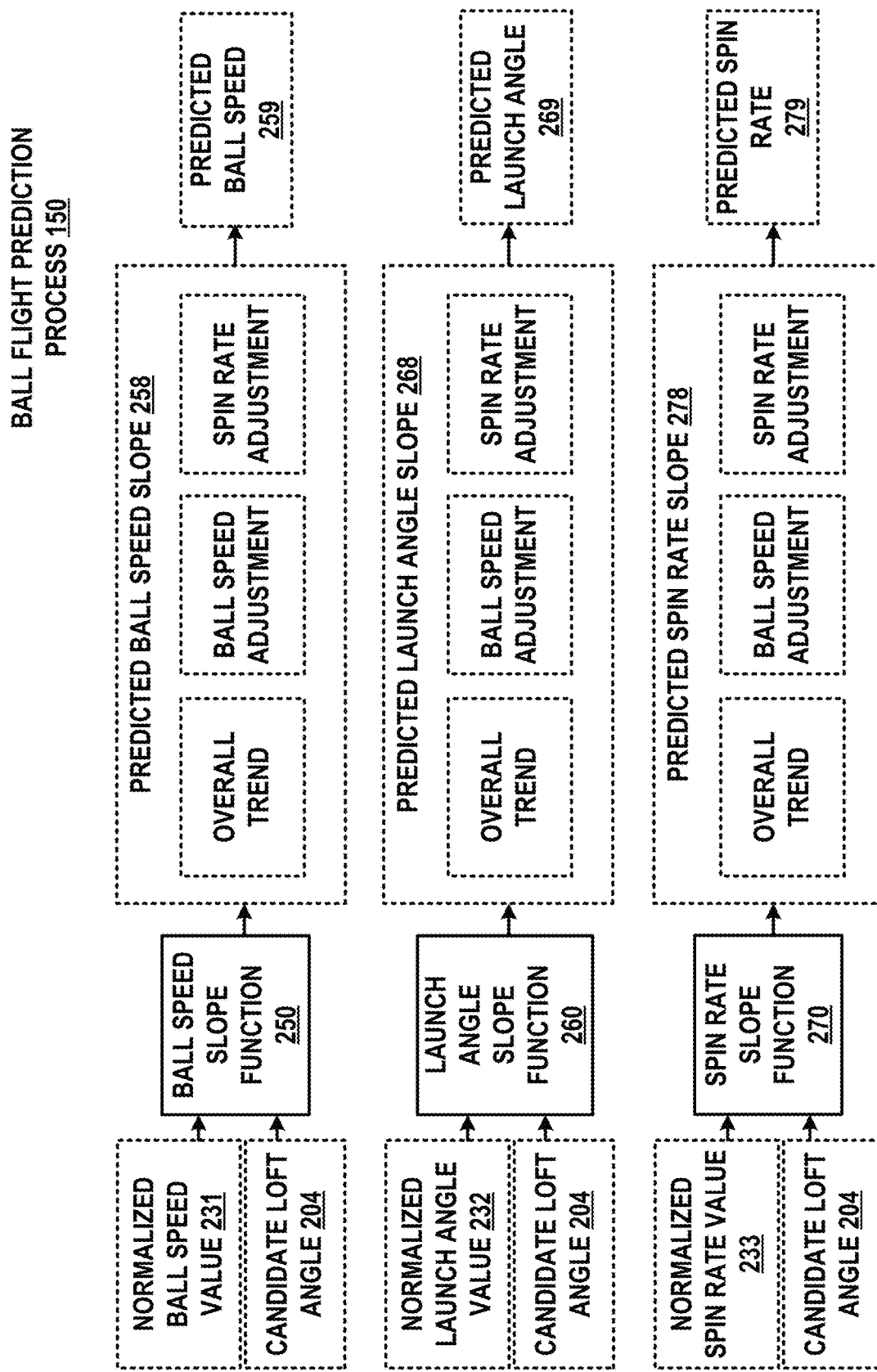
FIG. 4A is an illustration of ball flight prediction of the predictive model executed by the processor introduced in FIG. 1A yielding a predicted ball speed, a predicted launch angle, and a predicted spin rate for a candidate club having a candidate loft angle.

Referring to FIG. 4A, the ball flight prediction process 150 can include a ball speed slope function 250, a launch angle slope function 260, and a spin rate slope function 270 that respectively determine a predicted ball speed slope 258, a predicted launch angle slope 268, and a predicted spin rate slope 278 for a candidate loft angle 204 of a candidate club 202 using the set of reference ball flight characteristics 130 for the individual 101. The predictive model 106 can then use the predicted ball speed slope 258, the predicted launch angle slope 268, and the predicted spin rate slope 278 to respectively determine a predicted ball speed 259, a predicted launch angle 269, and a predicted spin rate 279.

Figure 4B:
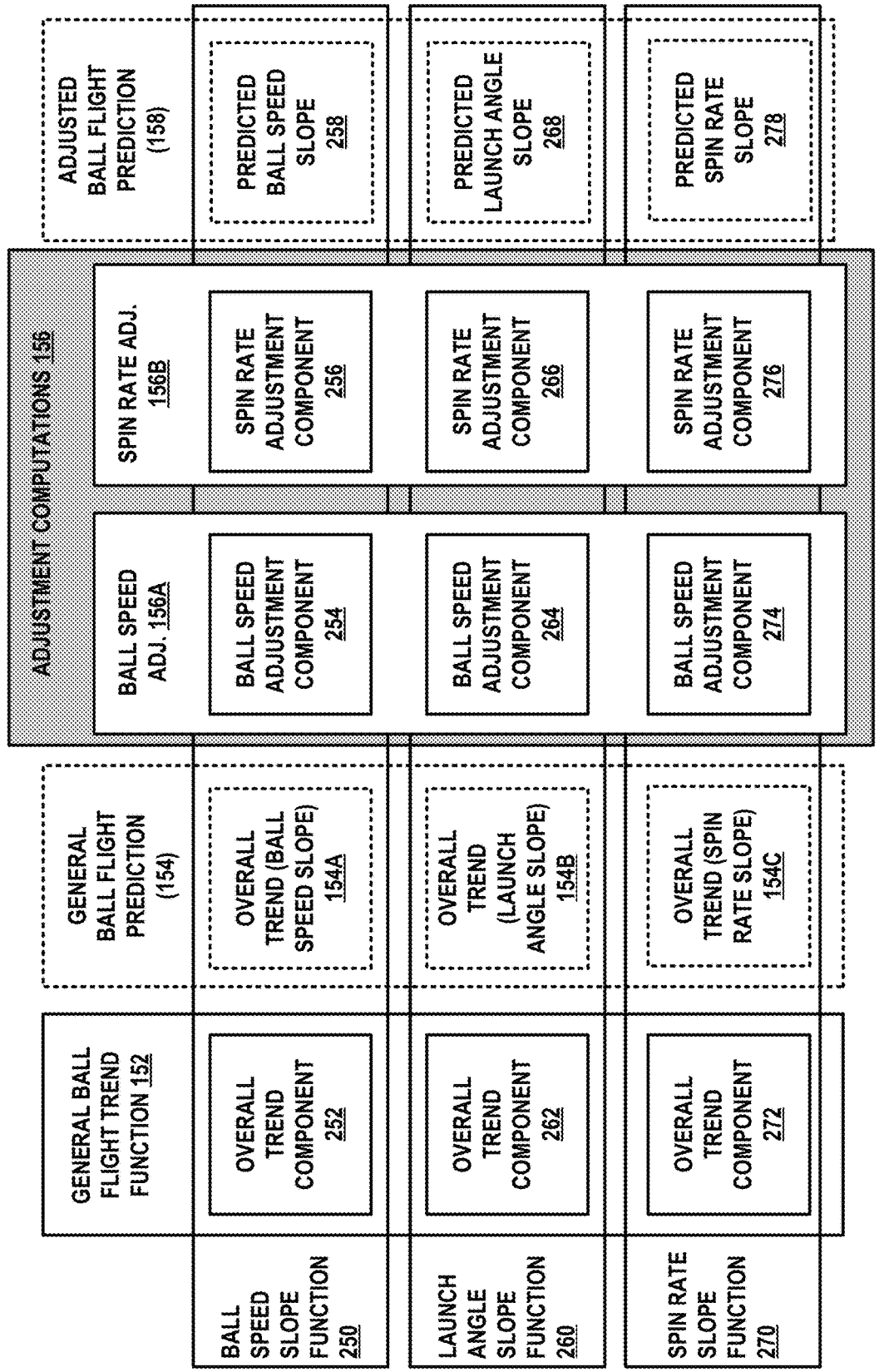
FIG. 4B is an illustration of ball flight prediction of the predictive model shown in FIG. 4A and including a ball flight trend function and one or more adjustment computations.

As shown with additional reference to FIG. 4B, the processor 104 can apply the ball flight trend function 152 to determine the general ball flight predictions 154 including an "overall trend" 154A for ball speed slope, an "overall trend" 154B for launch angle slope, and an "overall trend" 154C for spin rate slope. The ball flight trend function 152 can include an "overall trend component" 252 of the ball speed slope function 250 resulting in the "overall trend" 154A for ball speed slope, an "overall trend component" 262 of the launch angle slope function 260 resulting in the "overall trend" 154B for launch angle slope, and an "overall trend component" 272 of the spin rate slope function 270 resulting in the "overall trend" 154C for spin rate slope. In particular, to determine the predicted ball flight characteristics 134, the processor 104 can apply the ball flight trend function 152 to determine the "overall trend" 154A associated with ball speed per degree change in club head loft angle, the "overall trend" 154B associated with launch angle per degree change in club head loft angle, and the "overall trend" component 154C associated with spin rate per degree change in club head loft angle. The ball flight trend function 152 can be further derived from a large dataset (e.g., dataset 153) that includes ball flight data observed and collected from a wide variety of "gapping tests." In such a gapping test, a golfer strikes several shots with various clubs in a golf club set each having different loft angles. From the ball flight data obtained through a wide variety gapping tests, general relationships are determined between loft angle and ball flight characteristics for a typical player to determine the general ball flight trend function 152. The ball flight trend function 152 can be applied by the processor 104 to the set of reference ball flight characteristics 130 to produce the general ball flight predictions 154 for various candidate clubs 202, which serves as a baseline to approximate ball flight characteristic values expected for different candidate clubs 202.

In many cases, the relationship between each ball flight characteristic and loft angle can be characterized as the expected change in a value of a ball flight characteristic per one-degree change in loft (e.g., a ball speed slope, a launch angle slope, and a spin rate slope). In most cases, the change in value of each ball flight characteristic varies with respect to different loft angle ranges. For example, the expected change in ball speed between a 34 degree club and a 35 degree club can be significantly higher or lower than the expected change in ball speed between a 59 degree club and a 60 degree club. The ball flight trend function 152 accounts for such discrepancies. At every possible loft angle, the ball flight trend function 152 accounts for the expected change in a given ball flight characteristic per degree change in loft.

The processor 104 executes the ball flight trend function 152 to using as input the reference ball flight characteristics 130 to generate the general ball flight prediction 154 for a plurality of candidate clubs 202.

Stated another way, the ball flight trend function 152 leverages the predetermined ball flight relationships described herein in view of the reference ball flight characteristics 130 of the reference club 126 to generate general predictions for ball speed, spin rate, launch angle, and/or other ball flight characteristics (e.g., an "overall trend component") defined by the general ball flight prediction 154. For example, for any given spin rate associated with the reference club (first) dataset, a general spin rate prediction can be determined for any candidate loft angle. The "overall trend" relating change in spin rate to change in loft angle can be applied by the processor 104 to the reference spin rate to determine a general spin rate prediction for each candidate loft angle. The processor 104 can apply the same process to generate a general launch angle prediction and a general ball speed prediction. From such predictions, the processor 104 can determine general predictions for other ball flight characteristics such as carry distance and total distance. The process employed by the processor 104 for generating general predictions for ball speed, spin rate, and launch angle is described in greater detail in following sections.

Ball Flight Characteristic Adjustments

Figure 12:
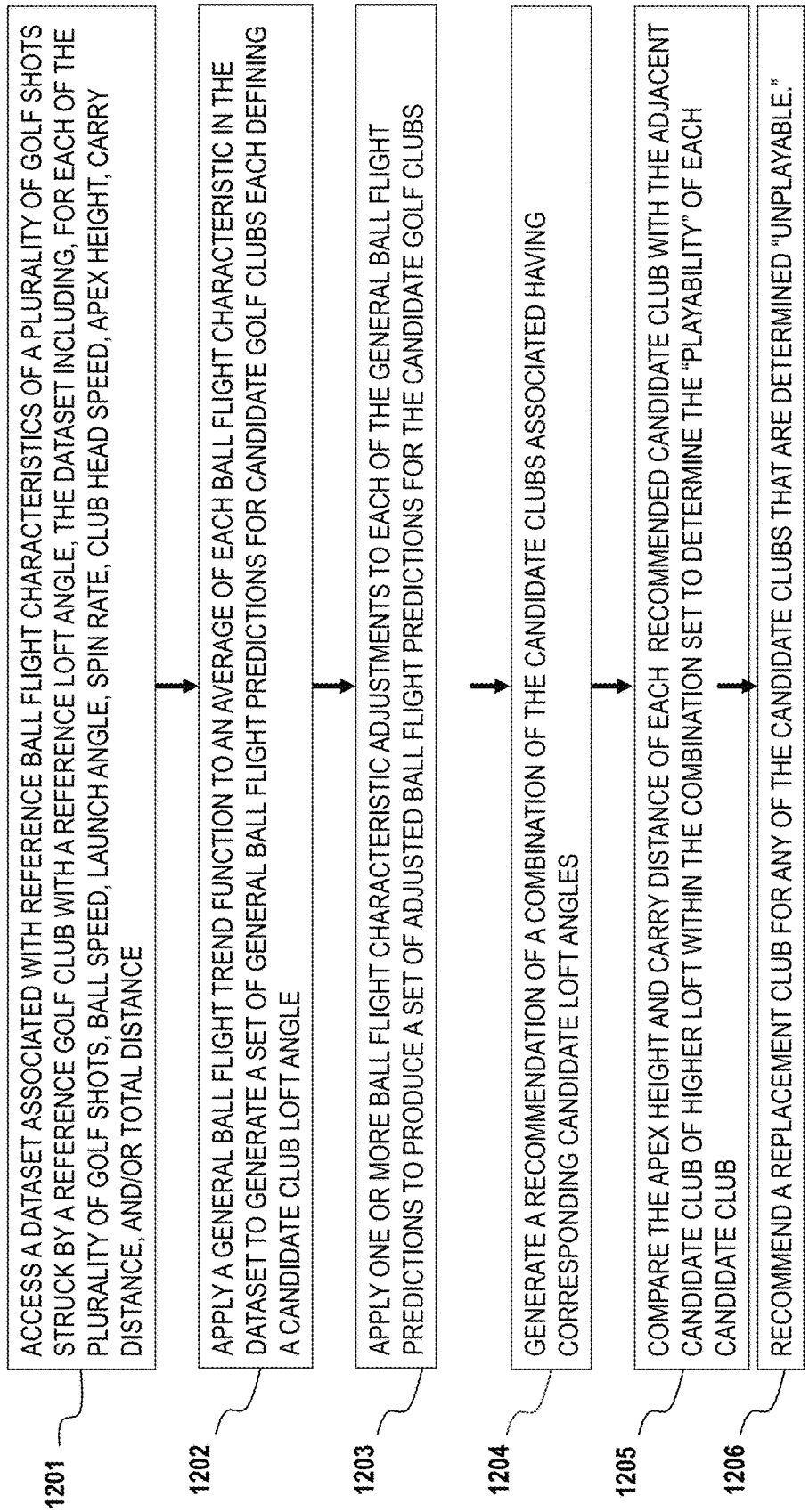
FIG. 12 illustrates a process flow diagram representing the process for implementing the system of FIG. 1A, wherein the system further recommends replacement clubs for predicted clubs that are determined "unplayable."
Figure 13:
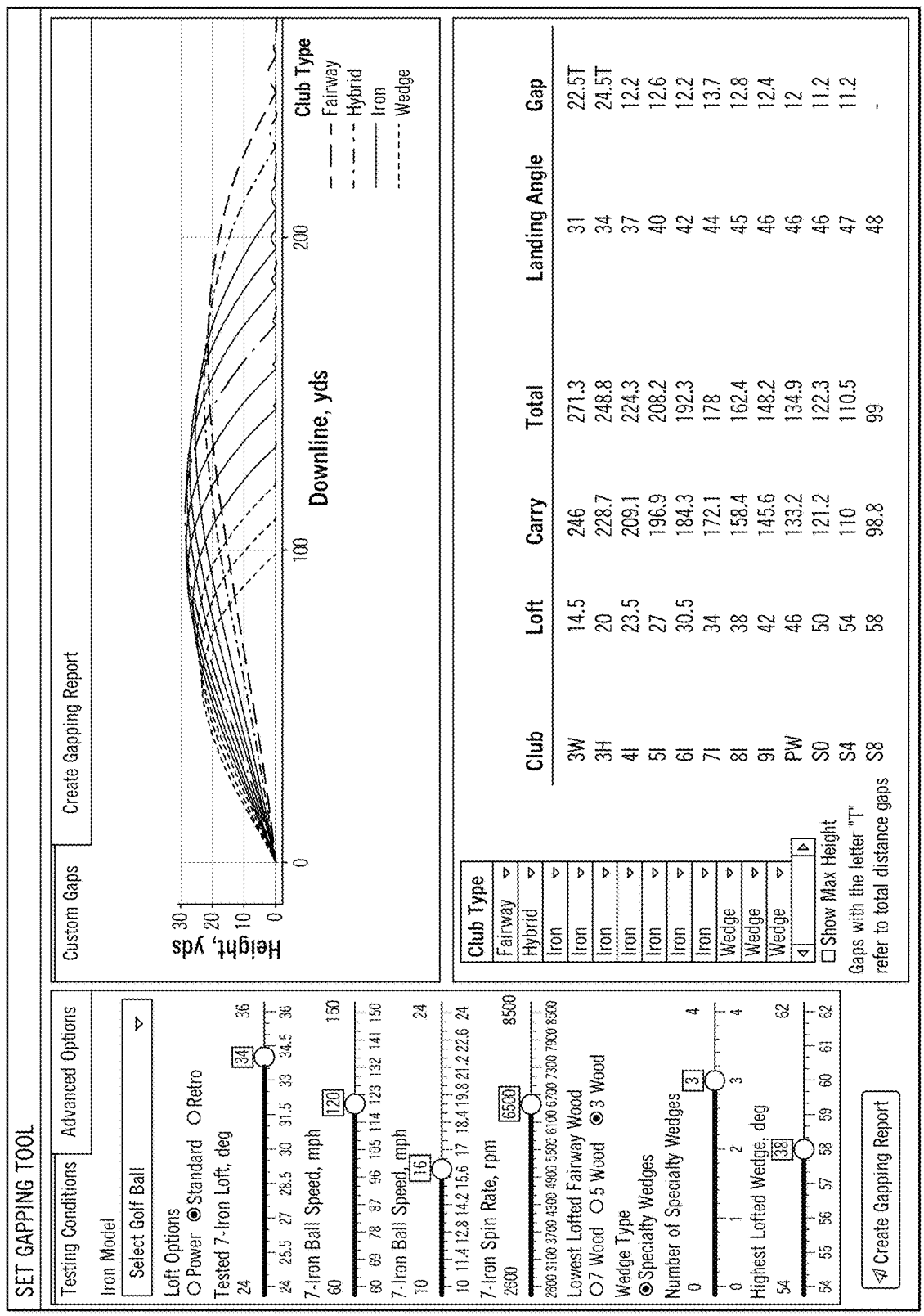
FIG. 13 is a screenshot of an exemplary user interface (UI) for providing further non-limiting details of the system described herein.

The general ball flight prediction 154 can provide an accurate prediction for the ball flight characteristics for the average player given the ball flight data from the reference club 126. However, for players whose ball speed or spin rate deviate from that of the average player, the relationships between loft angle and each ball flight characteristic can be drastically different than those of the typical player. For example, players having an above average spin rate at a given loft angle might expect a more drastic change in ball speed, spin rate, and/or launch angle per degree loft than players with an average spin rate. Similarly, players having an above average ball speed at a given loft angle might expect a more drastic change in ball speed, spin rate, and/or launch angle per degree loft than players with an average ball speed. Therefore, the general ball flight prediction 154 alone may not be a sufficiently accurate estimate of the ball flight characteristics of every candidate club 202 for every player. To account for such discrepancies, as illustrated in block 903 of FIG. 9, the processor 104 can further apply one or more ball flight characteristic adjustment computations 156 (also referred to herein as one or more adjustments) to the general ball flight prediction 154 result to produce an adjusted ball flight prediction 158 for each candidate club 202 for a specific player. Example screenshots of a user interface (UI) driven by the processor 104 generating a plurality of predicted ball flight metrics for candidates clubs 202 is shown in FIGS. 12 and 13.

In many examples, as further shown in FIG. 4B, the plurality of ball flight characteristic adjustment computations 156 include a ball speed adjustment 156A and a spin rate adjustment 156B that account for the effect on each ball flight characteristic (e.g., ball speed, spin rate, launch angle, etc.) due to the deviation from a baseline ball speed and a baseline spin rate, respectively. The baseline ball speed and a baseline spin rate can respectively represent an average ball speed and an average spin rate that are observed over a plurality of players. The processor 104 can apply the ball speed adjustment 156A and the spin rate adjustment 156B to the overall gapping trends to account for the effect of abnormal ball speed and spin rate on the relationships between each of a) loft angle and spin rate, b) loft angle and ball speed, and c) loft angle and launch angle. For example, the processor 104 can apply both the ball speed adjustment 156A and the spin rate adjustment 156B to a general spin rate prediction (e.g., the "overall trend" 154C for spin rate slope) to produce an adjusted spin rate prediction (e.g., the predicted spin rate slope 278), because both an abnormal (i.e., above or below average) ball speed and an abnormal spin rate will influence the relationship between spin rate and loft angle. In some cases, the reference ball flight characteristics 130 for the given individual 101 may exhibit an abnormal spin rate and a normal (e.g., approximately average) ball speed. In this case, the ball speed adjustment 156A will be negligible. In other cases, the reference ball flight characteristics 130 for the given individual 101 may exhibit a normal spin rate and an abnormal ball speed. In this case, the spin rate adjustment 156B will be negligible.

The processor 104 applies the ball speed adjustment 156A based on the normalized ball speed recorded from the reference ball flight data 120. The ball speed adjustment 156A takes into account the effect abnormal ball speeds have on the predicted ball flight characteristics 134 of the candidate clubs 202. An abnormal ball speed impacts the rate of change of ball speed, spin rate, and launch angle per degree change in loft angle. Generally, the severity of the ball speed adjustment 156A is proportional to the abnormality of the normalized ball speed measured from the reference club 126 relative to the baseline ball speed. For example, at a particular loft angle, the general ball flight prediction 154 might expect a spin rate increase of 200 rpm per degree increase in loft angle. At the same loft angle, a first player with a reference club ball speed that is 1 mph above average might expect a spin rate increase of 210 rpm per degree increase in loft angle, while a second player with a reference club ball speed that is 2 mph above average might expect a spin rate increase of 220 rpm per degree increase in loft angle. In this situation, the ball speed adjustment at the particular loft angle for the first player would be 10 rpm per degree loft while the ball speed adjustment for the second player would be 20 rpm per degree loft. Similarly, at the same loft angle, a third player having a reference club ball speed that is 1 mph below average would expect to see an increase of 190 rpm per degree increase in loft angle (a ball speed adjustment of −10 rpm per degree). The processor 104 can similarly apply the ball speed adjustment 156A to determine the change in launch angle per degree loft for a particular player as well as the change in ball speed per degree loft for a particular player.

Similarly, the processor 104 can apply the spin rate adjustment 156B based on the normalized spin rate recorded from the reference ball flight data 120. The spin rate adjustment 156B takes into account the effect abnormal spin rates have on the predicted ball flight characteristics 134 of the candidate clubs 202. An abnormal spin rate as measured from the reference club impacts the rate of change of ball speed, spin rate, and launch angle per degree change in loft angle. Generally, the severity of the spin rate adjustment 156B is proportional to the abnormality of the normalized spin rate measured from the reference club 126 relative to the baseline spin rate. For example, at a particular loft angle, the overall gapping trend might expect a ball speed increase of 1 mph per degree increase in loft angle. At the same loft angle, a first player with a reference club spin rate that is 2000 rpm above average might expect a ball speed increase of 0.9 mph per degree increase in loft angle, while a second player with a reference club spin rate that is 4000 rpm above average might expect a ball speed increase of 0.8 mph per degree increase in loft angle. In this situation, the spin rate adjustment for the first player would be −0.1 mph per degree loft while the spin rate adjustment for the second player would be −0.2 mph per degree loft. Similarly, at the same loft angle, a third player having a spin rate 2000 rpm below average would expect to see a ball speed increase of 1.1 mph per degree increase in loft angle (a spin rate adjustment of 0.1 mph per degree loft). The processor 104 can similarly apply the spin rate adjustment 156B to determine the change in launch angle per degree loft for a particular player as well as the change in spin rate per degree loft for a particular player.

In many instances, a player's reference ball flight data 120 may exhibit both an abnormal ball speed and an abnormal spin rate, in which case the processor 104 applies both the ball speed adjustment 156A and the spin rate adjustment 156B to the general ball flight prediction 154 to produce the adjusted ball flight prediction 158. Ball speed and spin rate work independently to influence each ball flight characteristic, however the combined effect of an abnormal ball speed and an abnormal spin rate on a given ball flight characteristic can be determined by simple addition of each respective ball flight characteristic adjustment. For example, if the ball speed adjustment as applied to the spin rate for a particular loft angle is 220 rpm per degree loft and the spin rate adjustment as applied to the spin rate for the same loft angle is 100 rpm per degree loft, then the total adjustment applied to the spin rate is 320 rpm per degree loft. Similarly, if the ball speed adjustment as applied to the spin rate for a particular loft angle is 100 rpm per degree loft and the spin rate adjustment as applied to the spin rate for the same loft angle is −200 rpm per degree loft, then the total adjustment applied to the spin rate is −100 rpm per degree loft.

The adjustment computations 156 as applied to the general ball flight predictions 154 can increase accuracy associated with estimation of the ball speed, spin rate, launch angle, and/or other ball flight characteristics of various candidate clubs 202. From the adjusted ball flight predictions 158, the processor 104 can produce an accurate prediction of the carry distance and/or total distance of each potential candidate club 202 that may be recommended or selected for use in a golf club set for the individual 101.

Generating the Predicted Ball Flight Characteristics

As discussed above with reference to FIGS. 4A and 4B, the processor 104 is operable to receive the set of reference ball flight characteristics 130 for a ball hit by an individual using the reference club 126 having the reference loft angle, and can predict how flight characteristics of the ball are expected to change if the individual hits the ball using a candidate club 202 having a candidate loft angle 204 based on the set of reference ball flight characteristics 130 obtained using the reference club 126. The set of reference ball flight characteristics 130 can include the normalized ball speed value and the normalized spin rate value, and can be normalized across more than one sample from the same individual and the same reference club 126. This section focuses on generation of the set of predicted ball flight characteristics 134 for a candidate club 202 using the set of reference ball flight characteristics 130 measured using the reference club 126.

Based on the set of reference ball flight characteristics 130 that are observed when the individual hits the ball using the reference club 126, the processor 104 is operable to determine a set of individual-specific slope values (e.g., the adjusted ball flight predictions 158) including an expected change in ball speed per degree change in loft angle (e.g., the predicted ball speed slope 258) using the ball speed slope function 250, an expected change in launch angle per degree change in loft angle (e.g., the predicted launch angle slope 268) using the launch angle slope function 260, and an expected change in spin rate per degree change in loft angle (e.g., the predicted spin rate slope 278) using the spin rate slope function 270.

Using these individual-specific slope values (e.g., the predicted ball speed slope 258, the predicted launch angle slope 268, and the predicted spin rate slope 278), the processor 104 can provide the set of predicted ball flight characteristics 134 including the predicted ball speed 259, the predicted launch angle 269, and the predicted spin rate 279 for each respective candidate club 202 of the plurality of candidate clubs 202 with knowledge of the candidate loft angle 204 associated with each respective candidate club 202. In particular:

1. Using the predicted ball speed slope 258, the processor 104 can determine the predicted ball speed 259 for a candidate club 202 having a candidate loft angle 204.
2. Using the predicted launch angle slope 268, the processor 104 can determine the predicted launch angle 269 for the candidate club 202 having the candidate loft angle 204.
3. Using the predicted spin rate slope 278, the processor 104 can determine the predicted spin rate 279 for the candidate club 202 having the candidate loft angle 204.

In one aspect, the processor 104 can generate the set of individual-specific slope values for the candidate club 202 by input of the set of reference ball flight characteristics 130 as normalized and the candidate loft angle 204 to the ball flight trend function 152 configured to predict changes in ball flight based upon predetermined correlations between loft angle and the ball flight characteristics (e.g., by determining the "overall trend" 154A of predicted ball speed slope 258, the "overall trend" 154B of predicted launch angle slope 268, and the "overall trend" 154C of predicted spin rate slope 278).

The processor 104 can then adjust the set of individual-specific slope values for the candidate club 202 by application of output from one or more adjustment computations 156 (that yield the adjusted ball flight predictions 158) that adjust for deviation of one or more of the set of reference ball flight characteristics 130 of the individual from a predetermined threshold (e.g., a baseline value including a baseline ball speed value 222 and a baseline spin rate value 224 for the reference club 126) the one or more adjustment computations 156 increasing computed-prediction accuracy by accounting for player-specific discrepancies. By way of example, these one or more adjustment computations 156 can include the "ball speed adjustment" 156A and the "spin rate adjustment" 156B for each individual-specific slope value of the set of individual-specific slope values (e.g., including a "ball speed adjustment component" 254 and a "spin rate adjustment component" 264 for the predicted ball speed slope 258, a "ball speed adjustment component" 264 and a "spin rate adjustment component" 266 for the predicted launch angle slope 268, and a "ball speed adjustment component" 276 and a "spin rate adjustment component" 278 for the predicted spin rate slope 278).

The set of individual-specific slope values for each respective predicted ball flight characteristic of the set of predicted ball flight characteristics 134 can then be consolidated or combined into a total individual-specific slope value (e.g., the predicted ball speed slope 258, the predicted launch angle slope 268, and the predicted spin rate slope 278) for each respective predicted ball flight characteristic of the set of predicted ball flight characteristics 134.

For instance, the set of individual-specific slope values for the predicted ball speed slope 258 can include the "overall trend" component 154A of predicted ball speed slope, the "ball speed adjustment" component 254 of predicted ball speed slope, and the "spin rate adjustment" component 256 of predicted ball speed slope, and the set of individual-specific slope values for the predicted ball speed slope can be combined to yield the total individual-specific slope value (e.g., the predicted ball speed slope 258) for the predicted ball speed. The predicted ball speed slope 258 can then be used to determine the predicted ball speed 259 of the set of predicted ball flight characteristics 134.

Similarly, the set of individual-specific slope values for the predicted launch angle slope 268 can include the "overall trend" component 154B of predicted launch angle slope, the "ball speed adjustment" component 264 of predicted launch angle slope, and the "spin rate adjustment" component 266 of predicted launch angle slope, and the set of individual-specific slope values for the predicted launch angle can be combined to yield the total individual-specific slope value (e.g., the predicted launch angle slope 268) for the predicted launch angle. The predicted launch angle slope 268 can then be used to determine the predicted launch angle 269. Likewise, the set of individual-specific slope values for the predicted spin rate slope 278 can include the "overall trend" component 154C of predicted spin rate slope, the "ball speed adjustment" component 274 of predicted spin rate slope, and the "spin rate adjustment" component 276 of predicted spin rate slope, and the set of individual-specific slope values for the predicted spin rate can be combined to yield the total individual-specific slope value (e.g., the predicted spin rate slope 278) for the predicted spin rate. The predicted spin rate slope 278 can then be used to determine the predicted spin rate 279 of the set of predicted ball flight characteristics 134.

As mentioned above, the processor 104 can then determine the predicted ball speed 259 for a candidate club 202 having a candidate loft angle 204 using the predicted ball speed slope 258 as adjusted and a difference in loft angle between the reference loft angle 206 and the candidate loft angle 204. Similarly, the processor 104 can determine the predicted launch angle 269 for the candidate club 202 having the candidate loft angle 204 using the predicted launch angle slope 268 as adjusted and a difference in loft angle between the reference loft angle 206 and the candidate loft angle 204. Likewise, the processor 104 can determine the predicted spin rate 279 for the candidate club 202 having the candidate loft angle 204 using the predicted spin rate slope 278 as adjusted and a difference in loft angle between the reference loft angle 206 and the candidate loft angle 204.

The processor 104 can iteratively repeat this process for each candidate club 202 of the plurality of candidate clubs 202 each having different candidate loft angles 204, and can collect the set of predicted ball flight characteristics 134 for the individual over the plurality of candidate clubs 202. Based on the set of predicted ball flight characteristics 134, the processor 104 can select an optimal set of recommended clubs 136 from the plurality of candidate clubs 202 for the individual that result in an optimal set of predicted ball flight characteristics 134.

A. Ball Speed Slope Function

Figure 5A:
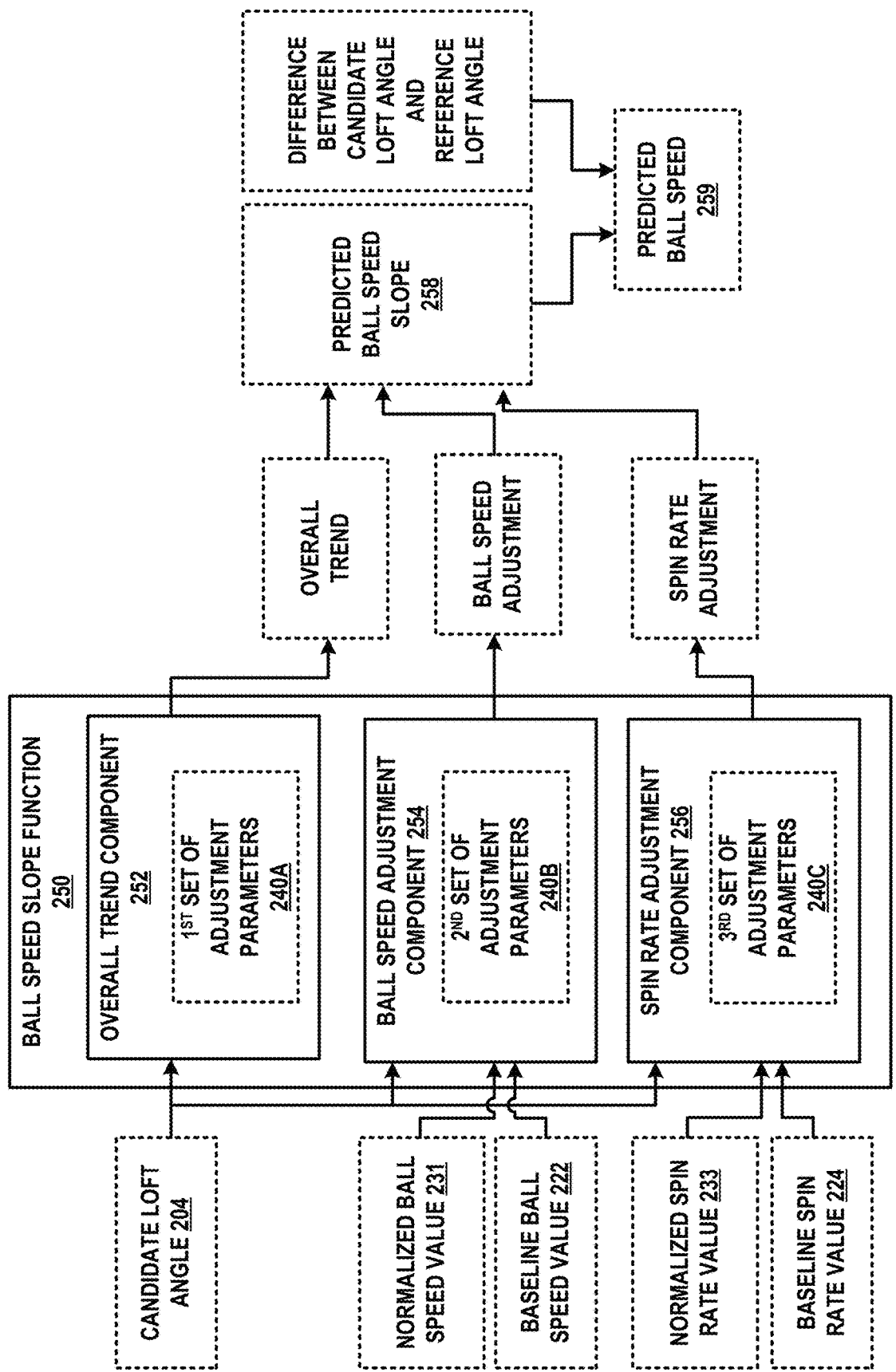
FIG. 5A is an illustration of ball speed prediction of the ball flight prediction introduced in FIGS. 4A and 4B.

With reference to FIG. 5A, the ball speed slope function 250 evaluated by the processor 104 for each candidate club 202 is indicative of the expected change in ball speed per degree change in loft angle that is specific to the individual, and includes an overall trend component 252, a ball speed adjustment component 254, and a spin rate adjustment component 256. The overall trend component 252 is indicative of an "overall trend" in rate of change of ball speed per degree change in loft angle, and is determined based on the candidate loft angle 204 of the candidate club 202. The ball speed adjustment component 254 is also determined based on the candidate loft angle 204 of the candidate club 202 and incorporates the normalized ball speed value 231 associated with the individual for the reference club 126 with respect to the baseline ball speed value 222 for the reference club 126. The spin rate adjustment component 256 is also determined based on the candidate loft angle 204 of the candidate club 202 and incorporates the normalized spin rate value 233 associated with the individual for the reference club 126 with respect to a baseline spin rate value 224 for the reference club 126.

i) Ball Speed Slope Function: Overall Trend Component

The processor 104 evaluates the overall trend component 252 of the ball speed slope function 250 based on the candidate loft angle 204 of the candidate club 202, and incorporates a first set of adjustment parameters 240A that are selected based on a classification range of the candidate loft angle 204 of the candidate club 202 (e.g., based on a range of candidate loft angle values that the candidate loft angle 204 falls into). In particular, the processor 104 selects values for the first set of adjustment parameters 240A from a total set of parameter values 240 stored in the memory 108 in communication with the processor 104; these values can be empirically determined and can be optimized for accuracy using data obtained through many reference flights. The processor 104 can use any number of classification ranges to assign the first set of adjustment parameters 240A in order to yield accurate results, and the classification ranges and values of the first set of adjustment parameters 240A can be unique to the overall trend component 252 of the ball speed slope function 250. For example, if the candidate loft angle 204 of the candidate club 202 falls within an $n^{th}$ classification range, then the processor 104 selects an $n^{th}$ set of values from the total set of parameter values for the first set of adjustment parameters 240A.

In one example, the processor 104 can evaluate the overall trend component 252 of the ball speed slope function 250 using the candidate loft angle 204 of the candidate club 202 as input, with the first set of adjustment parameters 240A of the overall trend component 252 being selected based on the classification range of the candidate loft angle 204 of the candidate club 202.

ii) Ball Speed Slope Function: Ball Speed Adjustment Component

The processor 104 evaluates the ball speed adjustment component 254 of the ball speed slope function 250 based on the candidate loft angle 204 of the candidate club 202 and based on the normalized ball speed value 231 associated with the individual 101 for the reference club 126. In particular, the ball speed adjustment component 254 incorporates the normalized ball speed value 231 associated with the individual 101 for the reference club 126 with respect to the baseline ball speed value 222 for the reference club 126 to yield a relative ball speed change value. When evaluating the ball speed adjustment component 254, the processor 104 combines the relative ball speed change value with a loft angle adjustment value that is determined in a manner similar to the overall trend component 252 using a second set of adjustment parameters 240B.

Similar to the overall trend component 252, to determine the loft angle adjustment value of the ball speed adjustment component 254, the processor 104 similarly incorporates the second set of adjustment parameters 240B that are selected based on a classification range of the candidate loft angle 204 of the candidate club 202 (e.g., based on a range of candidate loft angle values that the candidate loft angle 204 falls into). In particular, the processor 104 selects values for the second set of adjustment parameters 240B from the total set of parameter values 240 stored in the memory 108 in communication with the processor 104; these values can be empirically determined and can be optimized for accuracy using data obtained through many reference flights. The processor 104 can use any number of classification ranges to assign the second set of adjustment parameters 240B in order to yield accurate results, and the classification ranges and values of the second set of adjustment parameters 240B can be unique to the ball speed adjustment component 254 of the ball speed slope function 250 for the loft angle adjustment value of the ball speed adjustment component 254, and can also can be different from those considered when evaluating the overall trend component 252.

In one example, the processor 104 can evaluate the ball speed adjustment component 254 of the ball speed slope function 250 using the normalized ball speed value 231 and the candidate loft angle 204 of the candidate club 202 as input, with the second set of adjustment parameters 240B of the ball speed adjustment component 254 being selected based on the classification range of the candidate loft angle 204 of the candidate club 202.

iii) Ball Speed Slope Function: Spin Rate Adjustment Component

The processor 104 evaluates the spin rate adjustment component 256 of the ball speed slope function 250 based on the candidate loft angle 204 of the candidate club 202 and based on the normalized spin rate value 233 associated with the individual 101 for the reference club 126. In particular, the spin rate adjustment component 256 incorporates the normalized spin rate value 233 associated with the individual 101 for the reference club 126 with respect to the baseline spin rate value 224 for the reference club 126 to yield a relative spin rate change value. When evaluating the spin rate adjustment component 256, the processor 104 combines the relative spin rate change value with a loft angle adjustment value that is determined in a manner similar to the overall trend component 252 using a third set of adjustment parameters 240C.

Similar to the overall trend component 252, to determine the loft angle adjustment value of the spin rate adjustment component 256, the processor 104 similarly incorporates a third set of adjustment parameters 240C that may or may not be selected based on a classification range of the candidate loft angle 204 of the candidate club 202 (e.g., based on a range of candidate loft angle values that the candidate loft angle 204 falls into). In particular, the processor 104 selects values for the third set of adjustment parameters 240C from the total set of parameter values 240 stored in the memory 108 in communication with the processor 104; these values can be empirically determined and can be optimized for accuracy using data obtained through many reference flights. The processor 104 can use any number of classification ranges to assign the third set of adjustment parameters 240C in order to yield accurate results, and the classification ranges and values of the third set of adjustment parameters 240C can be unique to the spin rate adjustment component 256 of the ball speed slope function 250. However, note that in some embodiments, the processor 104 may not consider a classification range, and may instead use pre-selected values for the third set of adjustment parameters 240C regardless of the value of the candidate loft angle 204.

In one example, the processor 104 can evaluate the spin rate adjustment component 256 of the ball speed slope function 250 using the normalized spin rate value 233 and the candidate loft angle 204 of the candidate club 202 as input and using the third set of adjustment parameters 240C.

iv) Determining Predicted Ball Speed using Ball Speed Slope

The processor 104 then combines the results of the overall trend component 252, the ball speed adjustment component 254 and the spin rate adjustment component 256 yielding the predicted ball speed slope 258 for the candidate club 202.

The processor 104 can then use the predicted ball speed slope 258 to determine the predicted ball speed 259 for the candidate club 202 having the candidate loft angle 204. First, the processor 104 can determine a difference in loft angle between the candidate loft angle 204 and the reference loft angle 206 yielding a loft angle difference. To determine the predicted ball speed, the processor 104 can take the product of the loft angle difference and the predicted ball speed slope to yield the predicted ball speed 259 for the candidate club 202 having the candidate loft angle 204.

B. Launch Angle Slope Function

Figure 5B:
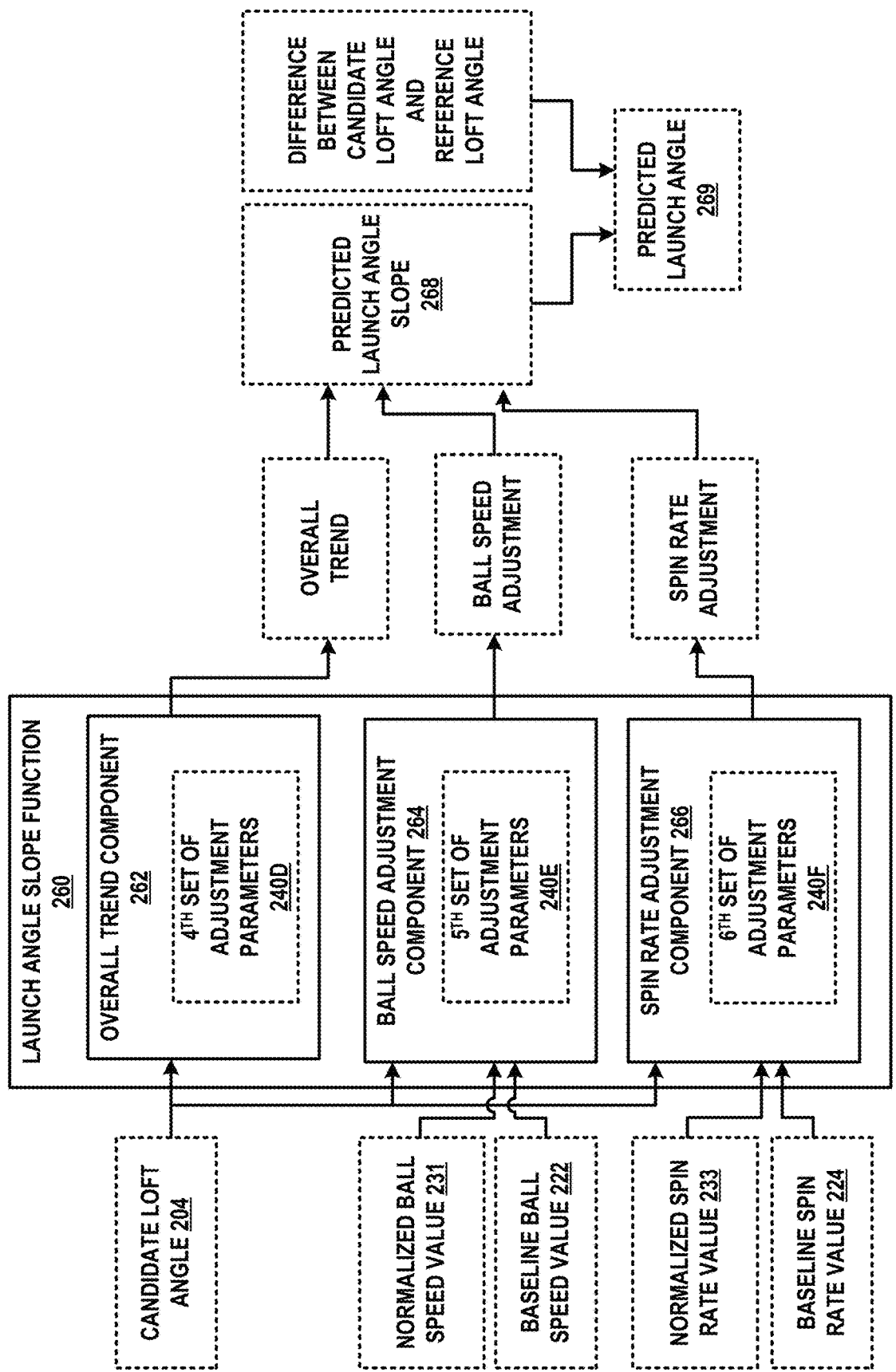
FIG. 5B is an illustration of launch angle prediction of the ball flight prediction introduced in FIGS. 4A and 4B.

Referring to FIG. 5B, the processor 104 can apply a similar process to determine the predicted launch angle slope 268 for a candidate club 202 using the launch angle slope function 260.

The launch angle slope function 260 evaluated by the processor 104 for each candidate club 202 is indicative of the expected change in launch angle per degree change in loft angle that is specific to the individual, and includes an overall trend component 262, a ball speed adjustment component 264, and a spin rate adjustment component 266. The overall trend component 262 is indicative of an "overall trend" in rate of change of launch angle per degree change in loft angle, and is determined based on the candidate loft angle 204 of the candidate club 202. The ball speed adjustment component 264 is also determined based on the candidate loft angle 204 of the candidate club 202 and incorporates the normalized ball speed value 231 associated with the individual 101 for the reference club 126 with respect to the baseline ball speed value 222 for the reference club 126. The spin rate adjustment component 266 is also determined based on the candidate loft angle 204 of the candidate club 202 and incorporates the normalized spin rate value 233 associated with the individual 101 for the reference club 126 with respect to the baseline spin rate value 224 for the reference club 126.

i) Launch Angle Slope Function: Overall Trend

The processor 104 evaluates the overall trend component 262 of the launch angle slope function 260 based on the candidate loft angle 204 of the candidate club 202, and incorporates a fourth set of adjustment parameters 240D that are selected based on a classification range of the candidate loft angle 204 of the candidate club 202 (e.g., based on a range of candidate loft angle values that the candidate loft angle 204 falls into). In particular, the processor 104 selects values for the fourth set of adjustment parameters 240D from the total set of parameter values 240 stored in the memory 108 in communication with the processor 104; these values can be empirically determined and can be optimized for accuracy using data obtained through many reference flights. The processor 104 can use any number of classification ranges to assign the fourth set of adjustment parameters 240D in order to yield accurate results, and the classification ranges and values of the fourth set of adjustment parameters 240D can be unique to the overall trend component 262 of the launch angle slope function 260.

In one example, the processor 104 can evaluate the overall trend component 262 of the launch angle slope function 260 using the candidate loft angle 204 of the candidate club 202 as input, with the fourth set of adjustment parameters 240D of the overall trend component 262 being selected based on the classification range of the candidate loft angle 204 of the candidate club 202.

ii) Launch Angle Slope Function: Ball Speed Adjustment Component

The processor 104 evaluates the ball speed adjustment component 264 of the launch angle slope function 260 based on the candidate loft angle 204 of the candidate club 202 and based on the normalized ball speed value 231 associated with the individual 101 for the reference club 126. In particular, the ball speed adjustment component 264 incorporates the normalized ball speed value 231 associated with the individual 101 for the reference club 126 with respect to the baseline ball speed value 222 for the reference club 126 to yield a relative ball speed change value. When evaluating the ball speed adjustment component 264 of the launch angle slope function 260, the processor 104 combines the relative ball speed change value with a loft angle adjustment value that is determined in a manner similar to the loft angle adjustment value of the ball speed adjustment component 254 of the ball speed slope function 250 using a fifth set of adjustment parameters 240E.

Similar to the ball speed adjustment component 254 of the ball speed slope function 250, to determine the loft angle adjustment value of the ball speed adjustment component 264 of the launch angle slope function 260, the processor 104 similarly incorporates the fifth set of adjustment parameters 240E that are selected based on a classification range of the candidate loft angle 204 of the candidate club 202 (e.g., based on a range of candidate loft angle values that the candidate loft angle 204 falls into). In particular, the processor 104 selects values for the fifth set of adjustment parameters 240E from the total set of parameter values 240 stored in the memory 108; these values can be empirically determined and can be optimized for accuracy using data obtained through many reference flights. The processor 104 can use any number of classification ranges to assign the fifth set of adjustment parameters 240E in order to yield accurate results, and the classification ranges and values of the fifth set of adjustment parameters 240E can be unique to the ball speed adjustment component 264 of the launch angle slope function 260.

In one example, the processor 104 can evaluate the ball speed adjustment component 264 of the launch angle slope function 260 using the normalized ball speed value 231 and the candidate loft angle 204 of the candidate club 202 as input, with the fifth set of adjustment parameters 240E of the ball speed adjustment component 264 being selected based on the classification range of the candidate loft angle 204 of the candidate club 202.

iii) Launch Angle Slope Function: Spin Rate Adjustment Component

The processor 104 evaluates the spin rate adjustment component 266 of the launch angle slope function 260 based on the candidate loft angle 204 of the candidate club 202 and based on the normalized spin rate value 233 associated with the individual 101 for the reference club 126. In particular, the spin rate adjustment component 266 incorporates the normalized spin rate value 233 associated with the individual 101 for the reference club 126 with respect to the baseline spin rate value 224 for the reference club 126 to yield a relative spin rate change value. When evaluating the spin rate adjustment component 266, the processor 104 combines the relative spin rate change value with a loft angle adjustment value that is determined in a manner similar to the loft angle adjustment value of the spin rate adjustment component 256 of the ball speed slope function 250 using a sixth set of adjustment parameters 240F.

Similar to the spin rate adjustment component 256 of the ball speed slope function 250, to determine the loft angle adjustment value of the spin rate adjustment component 266 of the launch angle slope function 260, the processor 104 similarly incorporates the sixth set of adjustment parameters 240F that are selected based on a classification range of the candidate loft angle 204 of the candidate club 202 (e.g., based on a range of candidate loft angle values that the candidate loft angle 204 falls into). In particular, the processor 104 selects values for the sixth set of adjustment parameters 240F from the total set of parameter values 240 stored in the memory 108 in communication with the processor 104; these values can be empirically determined and can be optimized for accuracy using data obtained through many reference flights. The processor 104 can use any number of classification ranges to assign the sixth set of adjustment parameters 240F in order to yield accurate results, and the classification ranges and values of the sixth set of adjustment parameters 240F can be unique to the spin rate adjustment component 266 of the launch angle slope function 260.

In one example, the processor 104 can evaluate the spin rate adjustment component 266 of the launch angle slope function 260 using the normalized spin rate value 233 and the candidate loft angle 204 of the candidate club 202 as input, with the sixth set of adjustment parameters 240F of the spin rate adjustment component 266 being selected based on the classification range of the candidate loft angle 204 of the candidate club 202.

iv) Determining Predicted Launch Angle using Launch Angle Slope

The processor 104 then combines the results of the overall trend component 262, the ball speed adjustment component 264 and the spin rate adjustment component 266 yielding the predicted launch angle slope 268 for the candidate club 202.

The processor 104 can then use the predicted launch angle slope 268 to determine the predicted launch angle 269 for the candidate club 202 having the candidate loft angle 204. First, the processor 104 considers the difference in loft angle between the candidate loft angle 204 and the reference loft angle 206 yielding the loft angle difference. To determine the predicted launch angle, the processor 104 then multiplies the loft angle difference by the predicted launch angle slope 268 to yield the predicted launch angle 269 for the candidate club 202 having the candidate loft angle 204.

C. Spin Rate Slope Function

Figure 5C:
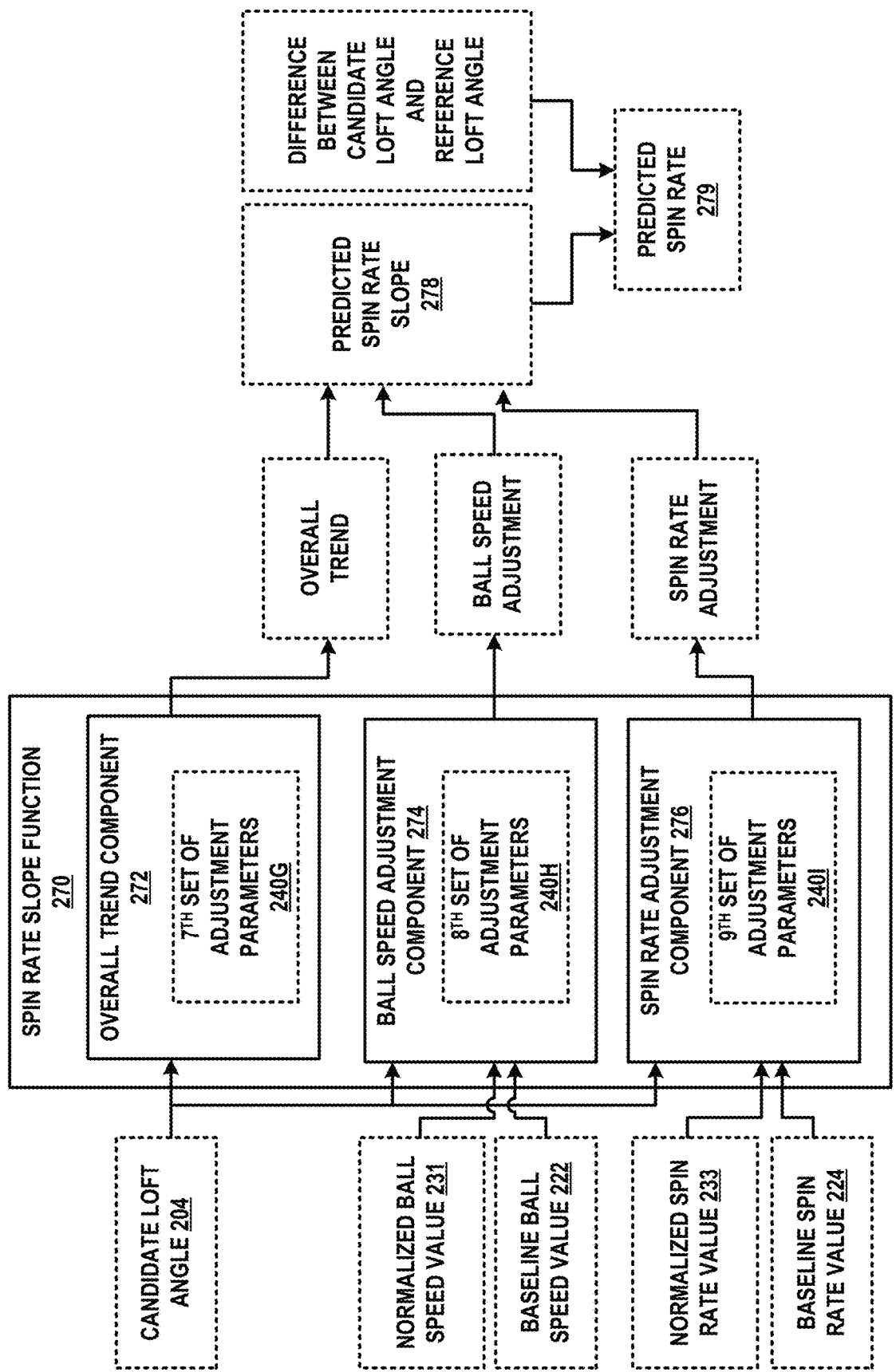
FIG. 5C is an illustration of spin rate prediction of the ball flight prediction introduced in FIGS. 4A and 4B.

Referring to FIG. 5C, the processor 104 can apply a similar process to determine the predicted spin rate slope 278 for a candidate club 202 using the spin rate slope function 270.

The spin rate slope function 270 evaluated by the processor 104 for each candidate club 202 is indicative of an expected change in spin rate per degree change in loft angle that is specific to the individual 101, and includes an overall trend component 272, a ball speed adjustment component 274, and a spin rate adjustment component 276. The overall trend component 272 is indicative of an "overall trend" in rate of change of spin rate per degree change in loft angle, and is determined based on the candidate loft angle 204 of the candidate club 202. The ball speed adjustment component 274 is also determined based on the candidate loft angle 204 of the candidate club 202 and incorporates the normalized ball speed value 231 associated with the individual 101 for the reference club 126 with respect to the baseline ball speed value 222 for the reference club 126. The spin rate adjustment component 276 is also determined based on the candidate loft angle 204 of the candidate club 202 and incorporates the normalized spin rate value 233 associated with the individual 101 for the reference club 126 with respect to the baseline spin rate value 224 for the reference club 126.

i) Spin Rate Slope Function: Overall Trend Component

The processor 104 evaluates the overall trend component 272 of the spin rate slope function 270 based on the candidate loft angle 204 of the candidate club 202, and incorporates a seventh set of adjustment parameters 240G that are selected based on a classification range of the candidate loft angle 204 of the candidate club 202 (e.g., based on a range of candidate loft angle values that the candidate loft angle 204 falls into). In particular, the processor 104 selects values for the seventh set of adjustment parameters 240G from the total set of parameter values 240 stored in the memory 108 in communication with the processor 104; these values can be empirically determined and can be optimized for accuracy using data obtained through many reference flights. The processor 104 can use any number of classification ranges to assign the seventh set of adjustment parameters 240G in order to yield accurate results, and the classification ranges and values of the seventh set of adjustment parameters 240G for the overall trend component 272 of the spin rate slope function 270 can be unique to the overall trend component 272 of the spin rate slope function 270.

In one example, the processor 104 can evaluate the overall trend component 272 of the spin rate slope function 270 using the candidate loft angle 204 of the candidate club 202 as input, with the seventh set of adjustment parameters 240G of the overall trend component 272 being selected based on the classification range of the candidate loft angle 204 of the candidate club 202.

ii) Spin Rate Slope Function: Ball Speed Adjustment Component

The processor 104 evaluates the ball speed adjustment component 274 of the spin rate slope function 270 based on the candidate loft angle 204 of the candidate club 202 and based on the normalized ball speed value 231 associated with the individual 101 for the reference club 126. In particular, the ball speed adjustment component 274 incorporates the normalized ball speed value 231 associated with the individual 101 for the reference club 126 with respect to the baseline ball speed value 222 for the reference club 126 to yield a relative ball speed change value. When evaluating the ball speed adjustment component 274 of the spin rate slope function 270, the processor 104 combines the relative ball speed change value with a loft angle adjustment value that is determined in a manner similar to the loft angle adjustment value of the ball speed adjustment component 254 of the ball speed slope function 250 and the loft angle adjustment value of the ball speed adjustment component 264 of the launch angle slope function 260 using an eighth set of adjustment parameters 240H.

Similar to the ball speed adjustment component 254 of the ball speed slope function 250 and the ball speed adjustment component 264 of the launch angle slope function 260, to determine the loft angle adjustment value of the ball speed adjustment component 274 of the spin rate slope function 270, the processor 104 similarly incorporates the eighth set of adjustment parameters 240G that are selected based on a classification range of the candidate loft angle 204 of the candidate club 202 (e.g., based on a range of candidate loft angle values that the candidate loft angle 204 falls into). In particular, the processor 104 selects values for the eighth set of adjustment parameters 240G from the total set of parameter values 240 stored in the memory 108 in communication with the processor 104; these values can be empirically determined and can be optimized for accuracy using data obtained through many reference flights. The processor 104 can use any number of classification ranges to assign the eighth set of adjustment parameters 240G in order to yield accurate results, and the classification ranges and values of the eighth set of adjustment parameters 240G can be unique to the ball speed adjustment component 274 of the spin rate slope function 270.

In one example, the processor 104 can evaluate the ball speed adjustment component 274 of the spin rate slope function 270 using the normalized ball speed value 231 and the candidate loft angle 204 of the candidate club 202 as input, with the eighth set of adjustment parameters 240G of the ball speed adjustment component 274 being selected based on the classification range of the candidate loft angle 204 of the candidate club 202.

iii) Spin Rate Slope Function: Spin Rate Adjustment Component

The processor 104 evaluates the spin rate adjustment component 276 of the spin rate slope function 270 based on the candidate loft angle 204 of the candidate club 202 and based on the normalized spin rate value 233 associated with the individual 101 for the reference club 126. In particular, the spin rate adjustment component 276 incorporates the normalized spin rate value 233 associated with the individual 101 for the reference club 126 with respect to the baseline spin rate value 224 for the reference club 126 to yield a relative spin rate change value. When evaluating the spin rate adjustment component 276, the processor 104 combines the relative spin rate change value with a loft angle adjustment value that is determined in a manner similar to the loft angle adjustment value of the spin rate adjustment component 256 of the ball speed slope function 250 and the loft angle adjustment value of the spin rate adjustment component 266 of the launch angle slope function 260 using a ninth set of adjustment parameters 240I.

Similar to the spin rate adjustment component 256 of the ball speed slope function 250 and the spin rate adjustment component 266 of the launch angle slope function 260, to determine the loft angle adjustment value of the spin rate adjustment component 276 of the spin rate slope function 270, the processor 104 similarly incorporates the ninth set of adjustment parameters 240I that are selected based on a classification range of the candidate loft angle 204 of the candidate club 202 (e.g., based on a range of candidate loft angle values that the candidate loft angle 204 falls into). In particular, the processor 104 selects values for the ninth set of adjustment parameters 240I from the total set of parameter values 240 stored in the memory 108 in communication with the processor 104; these values can be empirically determined and can be optimized for accuracy using data obtained through many reference flights. The processor 104 can use any number of classification ranges to assign the ninth set of adjustment parameters 240I in order to yield accurate results, and the classification ranges and values of the ninth set of adjustment parameters 240I can be unique to the spin rate adjustment component 276 of the spin rate slope function 170.

In one example, the processor 104 can evaluate the spin rate adjustment component 276 of the spin rate slope function 270 using the normalized spin rate value 233 and the candidate loft angle 204 of the candidate club 202 as input, with the ninth set of adjustment parameters 240I of the spin rate adjustment component 276 being selected based on the classification range of the candidate loft angle 204 of the candidate club 202.

iv) Determining Predicted Spin Rate using Spin Rate Slope

The processor 104 then combines the results of the overall trend component 272, the ball speed adjustment component 274 and the spin rate adjustment component 276 yielding the predicted spin rate slope 278 for the candidate club 202.

The processor 104 can then use the predicted spin rate slope 278 to determine the predicted spin rate 279 for the candidate club 202 having the candidate loft angle 204. First, the processor 104 considers the difference in loft angle between the candidate loft angle 204 and the reference loft angle 206 yielding the loft angle difference. To determine the predicted spin rate 279, the processor 104 then multiplies the loft angle difference by the predicted spin rate slope 278 to yield the predicted spin rate 279 for the candidate club 202 having the candidate loft angle 204.

Optimizing Predicted Club Loft Angle Combinations for Consistently Gapped Set

Figure 6:
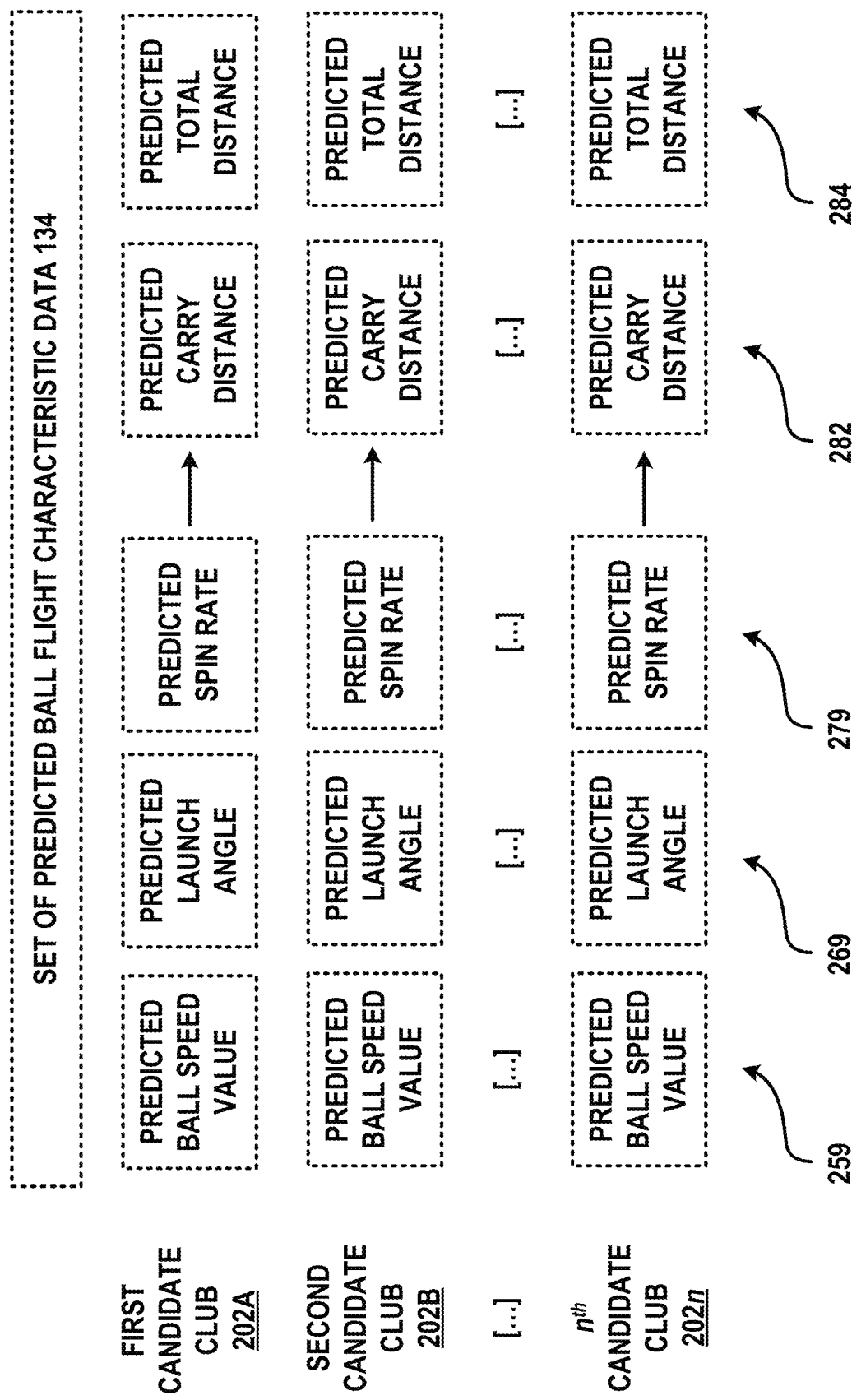
FIG. 6 is an illustration of a plurality of ball flight predictions of the predictive model executed by the processor introduced in FIG. 1A for a plurality of candidate clubs.
Figure 7:
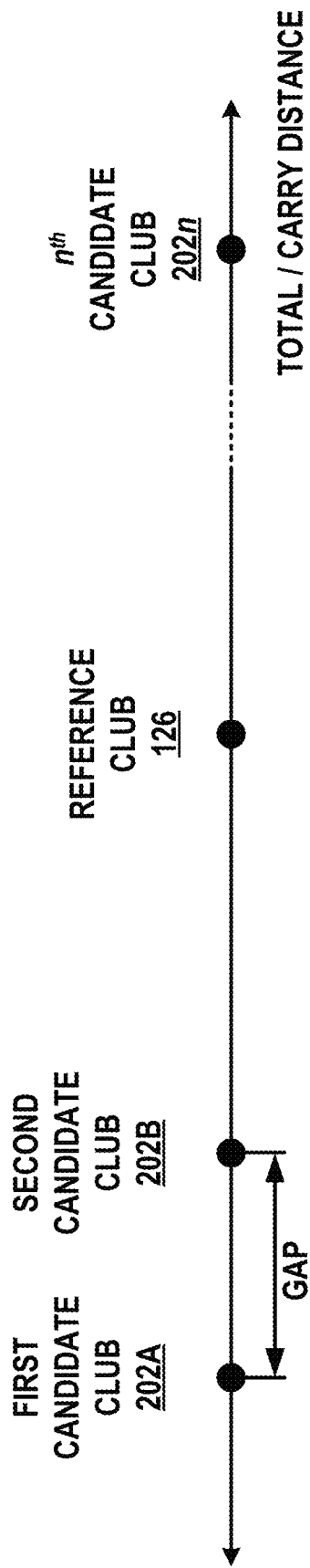
FIG. 7 is an illustration of gapping for the plurality of candidate clubs and the reference club based on the plurality of ball flight predictions, including total distance and/or carry distance.
Figure 8:
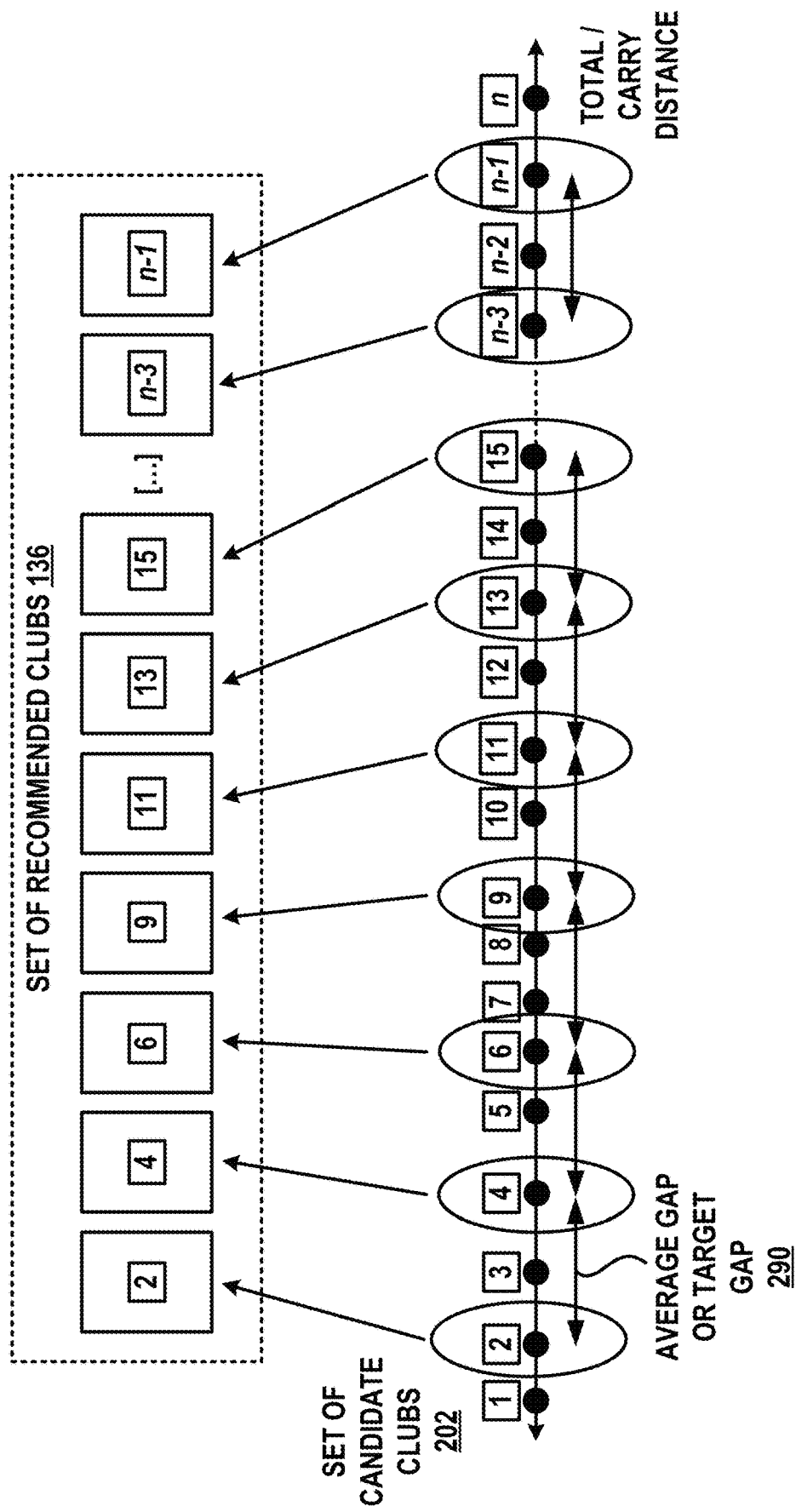
FIG. 8 is an illustration of selection of one or more recommended clubs from the plurality of candidate clubs based on gapping and the plurality of ball flight predictions.

With reference to FIGS. 6-8, the processor 104 leverages the predicted ball flight characteristics 134 as adjusted to identify the set of recommended clubs 136 selected from the plurality of candidate clubs 202 (shown in the figures as candidate clubs 202A-202n) with optimized gapping. The processor 104 determines an optimal combination of recommended clubs 136 from the plurality of candidate clubs 202 by evaluating the set of predicted ball flight characteristics 134 as adjusted of each candidate loft angle 204 available for each candidate club 202. Specifically, the processor 104 determines a predicted carry distance 282 and/or predicted total distance 284 for each candidate loft angle 204 and selects predicted loft angles that correspond with the set of recommended clubs 136 in such a way that the gaps (FIGS. 7 and 8) between carry distances of each recommended club 136 are consistent. As such, the processor 104 selects the set of recommended clubs 136 from the plurality of candidate clubs that collectively result in optimal gapping between each predicted club.

In one aspect, the processor 104 can determine a predicted carry distance and/or a predicted total distance of the set of predicted ball flight characteristics 134 for a candidate club 202 having the candidate loft angle 204 using the predicted ball speed, the predicted launch angle and/or the predicted spin rate for the candidate loft angle 204. For example, the processor 104 can determine the predicted carry distance using a projectile motion function that takes the predicted ball speed, the predicted launch angle and the predicted spin rate as input and models the flight trajectory of a ball hypothetically hit using the candidate club 202, including at least one of: a predicted apex height, a predicted carry distance, and a predicted total distance.

Aspects of the projectile motion function, including constants and operators, are pre-determined based on observable correlations and physics principles well understood by one of ordinary skill in the art. In general, the predicted and/or carry distance can be dependent on ball speed, launch angle, the force of gravity, air resistance, and lift force. The air resistance can depend on the velocity of the ball, the surface area of the ball, and an empirically derived drag coefficient, wherein the drag coefficient can be dependent on spin rate and ball speed. Similarly, the lift force can be dependent on an empirically derived coefficient of lift, wherein the coefficient of lift is dependent on spin rate and ball speed.

Optionally, the projectile motion function can incorporate at least one of an expected mass of the ball, an expected air temperature, and/or an expected air density to determine the predicted carry distance using the predicted ball speed, the predicted launch angle, and the predicted spin rate. In a further aspect, the processor 104 can determine a predicted total distance of the set of predicted ball flight characteristics 134 for a candidate club 202 using the predicted carry distance and can optionally incorporate an expected coefficient of friction of a ground surface (e.g., fairway, rough, green, etc.).

The processor 104 can generate a prediction for the ball flight characteristics of every possible loft angle that can be used for a club head within the set. A typical golf club set includes a limited number of clubs (generally 14) spread out over a wide range of loft angles. Excluding drivers and putters, a typical golf club set comprises 12 clubs having loft angles spread approximately evenly over a range of loft angles from approximately 14 degrees to approximately 60 degrees. To provide a recommendation for a useful golf club set, the processor 104 must identify the combination of recommended clubs 136 from the plurality of candidate clubs 202 that not only provide consistent gaps between the carry distance 282 of each recommended club 136, but also provides a wide range of loft angles to fill out the entire set of recommended clubs 136. In some embodiments, each candidate loft angle 204 can be classified as corresponding to a certain club "number" (i.e. 5-iron, 6-iron, 7-iron, etc.). For example, the adjusted ball flight prediction 158 generated for candidate loft angles 204 between 34 and 37.5 degrees can be classified as corresponding to an 8-iron, whereas the adjusted ball flight prediction 158 generated for candidate loft angles 204 between 38 and 41.5 degrees can be classified as corresponding to a 9-iron. The processor 104 can be configured to identify one recommended club 136 having a loft angle from each range of candidate loft angles 204 associated with each club number. Within the parameter that one recommended club 136 of each club number must be selected, the processor 104 can identify the optimal combination of loft angles from the plurality of candidate loft angles 204 that produce a desired gap between predicted ball flight distances (e.g., predicted carry distance 282 and/or predicted total distance 284) that are associated with each respective recommended club 136. This allows the processor 104 to identify a combination of loft angles that make up a full set of recommended clubs 136, while still providing consistent gapping within the set of recommended clubs 136. Following identification of the set of recommended clubs 136 that result in optimal gapping, the system 100 can display, at the display device 138 in communication with the processor 104, information related to the set of recommended clubs 136 (e.g., the display device 138 can display information that includes a recommendation of the set of recommended clubs 136).

In many embodiments, the range of loft angles associated with each club type can be sequential between different club types. For example, if an 8-iron is associated with loft angles between 34 and 37.5 degrees, a 7-iron might be associated with loft angles between 28 and 33.5 degrees, and a 6-iron might be associated with loft angles between 24 and 27.5 degrees. In alternative embodiments, the range of loft angles associated with each club type can overlap the range of loft angles associated with each adjacent club type. Such overlapping loft angle ranges allow for a greater number of possible loft angle combinations to be evaluated by the processor 104 to identify the set of recommended clubs 136 with optimized gapping. For example, in some embodiments, the processor 104 can classify a predicted loft angle of 34 degrees as an 8-iron in some potential combinations and classify a predicted loft angle of 34 degrees as a 7-iron in other potential combinations. This allows the processor 104 to evaluate a greater number of possible combinations of recommended clubs 136 to identify a set of recommended clubs 136 with optimized gapping.

In some embodiments, if the reference club 126 struck by the player during a fitting session is a 7-iron associated with the reference loft angle 206, the system can still evaluate alternative possibilities of loft angles for the 7-iron of the set of recommended clubs 136. In this way, the recommendation is not limited to selecting the particular loft angle of the reference club 126 for use as the 7-iron within the set of recommended clubs 136.

As shown in FIG. 8, the processor 104 identifies the set of recommended clubs 136 by selecting one loft angle corresponding to each club number to identify a combination of recommended clubs 136 from the plurality of candidate clubs 202 that best complete the set. Every recommended club 136 is associated with a predicted distance, and any given set of recommended clubs 136 comprises a certain gapping based on the predicted carry distance 282 or predicted total distance 284 of each recommended club 136 within the set of recommended clubs 136. Referring to block 904 of FIG. 9, the processor 104 can evaluate all possible combinations of the set of recommended clubs 136 from the plurality of candidate clubs 202 to determine which combination comprises the most desirable gapping within the set of recommended clubs 136 (e.g., by evaluating predicted carry distances 282 or predicted total distances 284 associated with each respective candidate club 202 and identifying the set of recommended clubs 136 from the plurality of candidate clubs 202 that collectively result in the most desirable gapping between predicted carry distances 282 or predicted total distances 284). In many embodiments, the processor 104 identifies a consistently gapped set by determining which combination of recommended clubs 136 results in the smallest variation in gaps between each recommended club 136 (e.g., the gap between the 3-iron and the 4-iron is the substantially the same as the gap between the 4-iron and the 5-iron, etc.).

In some embodiments, a player may desire a set of golf clubs that collectively have a specific average gap between club distances (hereafter referred to as a "target gap" 290) rather than the most consistent gap possible. Rather than recommending the smallest variation between predicted club gaps, the processor 104 can identify the set of recommended clubs 136 from the plurality of candidate clubs 202 where the average predicted gap between clubs is as close to the target gap 290 as possible, and can display the information indicative of the set of recommended clubs 136. As such, in some embodiments, the processor 104 can receive input data indicative of the target gap 290. For example, there may be some situations wherein to achieve the most consistent gapping for a particular player, the average gap might be approximately 12 yards. However, if the player desires a target gap 290 of approximately 10 yards, the processor 104 can be configured to identify set of recommended clubs 136 where the average predicted gap between each recommended club 136 is as close to 10 yards as possible, even if the predicted gaps in such a recommendation are slightly less consistent.

Figure 10:
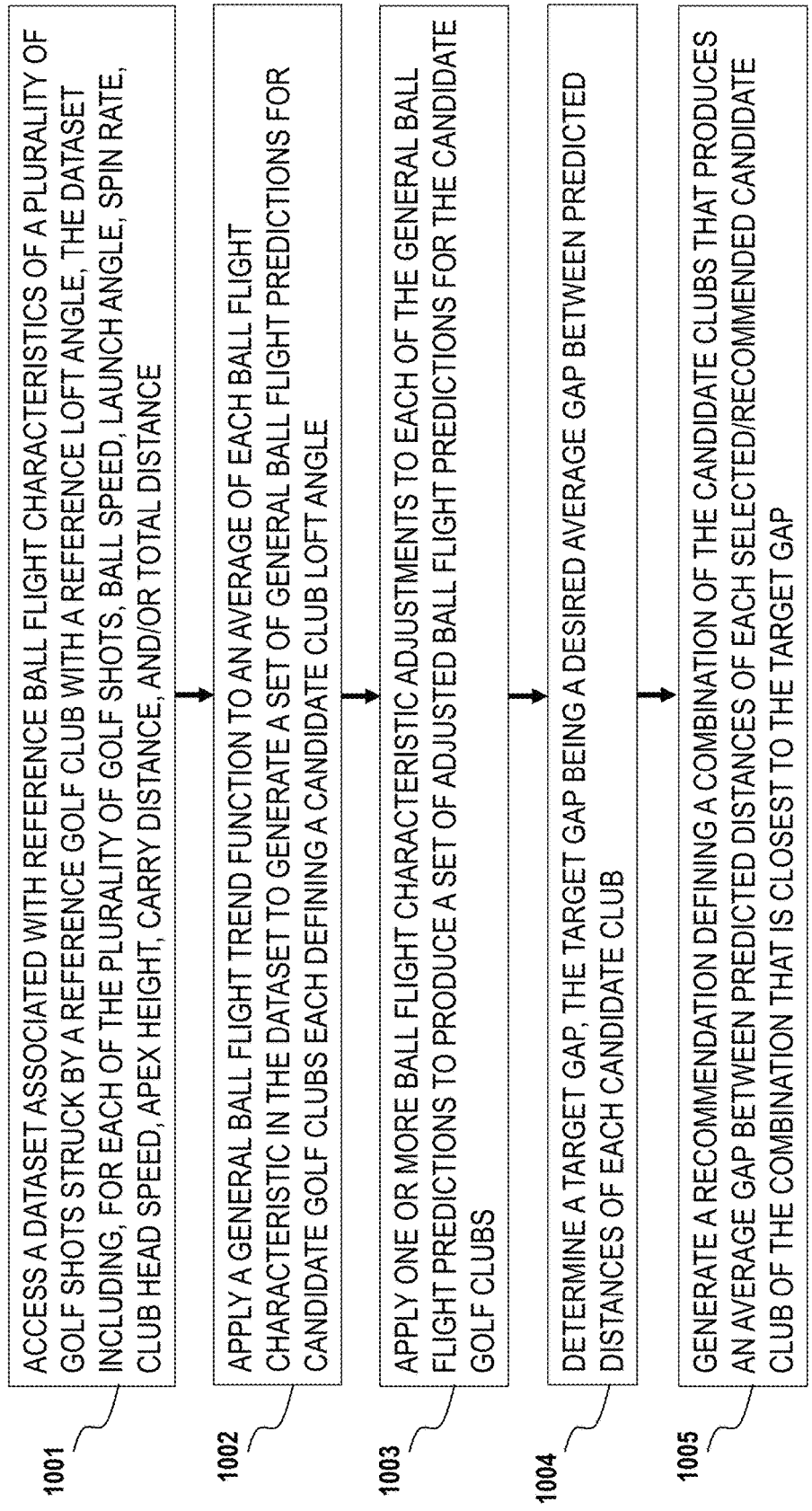
FIG. 10 illustrates a process flow diagram representing an alternative process for implementing the system of FIG. 1A to generate a recommendation for a predicted club set wherein the gap between each predicted distance is optimized about a predetermined target gap.

FIG. 10 illustrates a process flow diagram outlining an alternative implementation of a process 1000 executable by the processor 104 wherein the set of recommended clubs 136 is optimized to a specific target gap 290. Blocks 1001, 1002, and 1003 are similar to blocks 901, 902, and 903 of process flow diagram 900, because the adjusted ball flight predictions 158 for each candidate club 202 are created the same way in both implementations. Referring to block 1004, the processor 104 can receive input data indicative of a predetermined target gap 290, where the target gap 290 can include an average gap between predicted distances of each recommended club 136 desired by the golfer. Referring to block 1005, the processor 104 identifies the set of recommended clubs 136 from the plurality of candidate clubs 202 that collectively result in an average gap between predicted distances that most closely matches the target gap 290. The processor 104 determines the optimal combination of recommended clubs 136 by evaluating the predicted distances of all possible combinations of candidate loft angles 204 for each candidate club 202, as described above in relation to FIG. 9.

In some embodiments, it may be desirable to have multiple target gaps within the set of recommended clubs 136. For example, in some embodiments a player might desire a smaller target gap 290 between low lofted clubs (i.e., 7-iron and clubs with lower lofts than a 7-iron) and a larger target gap 290 between high lofted clubs (i.e., clubs with higher lofts than a 7-iron) or vice versa. The processor 104 can be further configured to identify the set of recommended clubs 136 from the plurality of candidate clubs 202 that result in optimal gapping for a plurality of target gaps 290.

Hybrid and Fairway Wood Tradeoffs

The processor 104 can be further operable to identify an optimal combination of fairway woods, hybrids, and irons for inclusion in the set of recommended clubs 136 from the plurality of candidate clubs 202. Depending on a given player's ball flight characteristics for lower lofted clubs, different players will achieve greater performance with different types of clubs (i.e. fairway wood, hybrid, or iron) for a given loft angle. Certain players have ball flight characteristics that are not conducive to playing low lofted iron-type clubs. For example, certain players, especially those with relatively low spin rates, struggle with low lofted irons such as a 3-iron or a 4-iron. Such players often experience increased performance using hybrids or fairway woods at such low loft angles rather than irons, such as using a 3-hybrid rather than a 3-iron. For a certain player whose ball flight characteristics are not conducive to playing low lofted irons, such low lofted irons can be considered "unplayable" for that player. Using the set of predicted ball flight characteristics 134 as adjusted for low lofted irons, the processor 104 can determine which irons will be unplayable for a given player and can identify suitable hybrids and/or fairway woods to replace such unplayable irons in the set.

In one aspect, the processor 104 can adjust the set of predicted ball flight characteristics 134 for a candidate loft angle based on the material of the candidate club (e.g., iron, hybrid, fairway wood, etc.). For instance, if the candidate club is a hybrid club, the processor 104 can adjust the set of predicted ball flight characteristics 134 accordingly. In particular, for a candidate loft angle 204, the processor 104 can determine an initial general ball flight prediction for the candidate loft angle 204 as discussed above resulting in the predicted ball speed 259, the predicted launch angle 269, and the predicted spin rate 279 for an iron candidate club 202 at the candidate loft angle 204. Then, to adjust the set of predicted ball flight characteristics 134 to reflect a hybrid candidate club 202 at the same candidate loft angle 204, the processor 104 can apply a hybrid ball speed adjustment to the predicted ball speed 259, a hybrid launch angle adjustment to the predicted launch angle 269, and a hybrid spin rate adjustment to the predicted spin rate 279 resulting in a hybrid ball speed, a hybrid launch angle, and a hybrid spin rate. This is reflected in FIG. 11A, which shows an overall hybrid adjustment 300 which will be described in greater detail below. Similarly, to adjust the set of predicted ball flight characteristics 134 to reflect a fairway wood candidate club 202 at the same candidate loft angle 204, the processor 104 can apply a fairway wood ball speed adjustment to the predicted ball speed 259, a fairway wood launch angle adjustment to the predicted launch angle 269, and a fairway wood spin rate adjustment to the predicted spin rate 279 resulting in a fairway wood ball speed, a fairway wood launch angle, and a fairway wood spin rate. This is reflected in FIG. 11B, which shows an overall fairway wood adjustment 400 which will also be described in greater detail below.

Figure 11A:
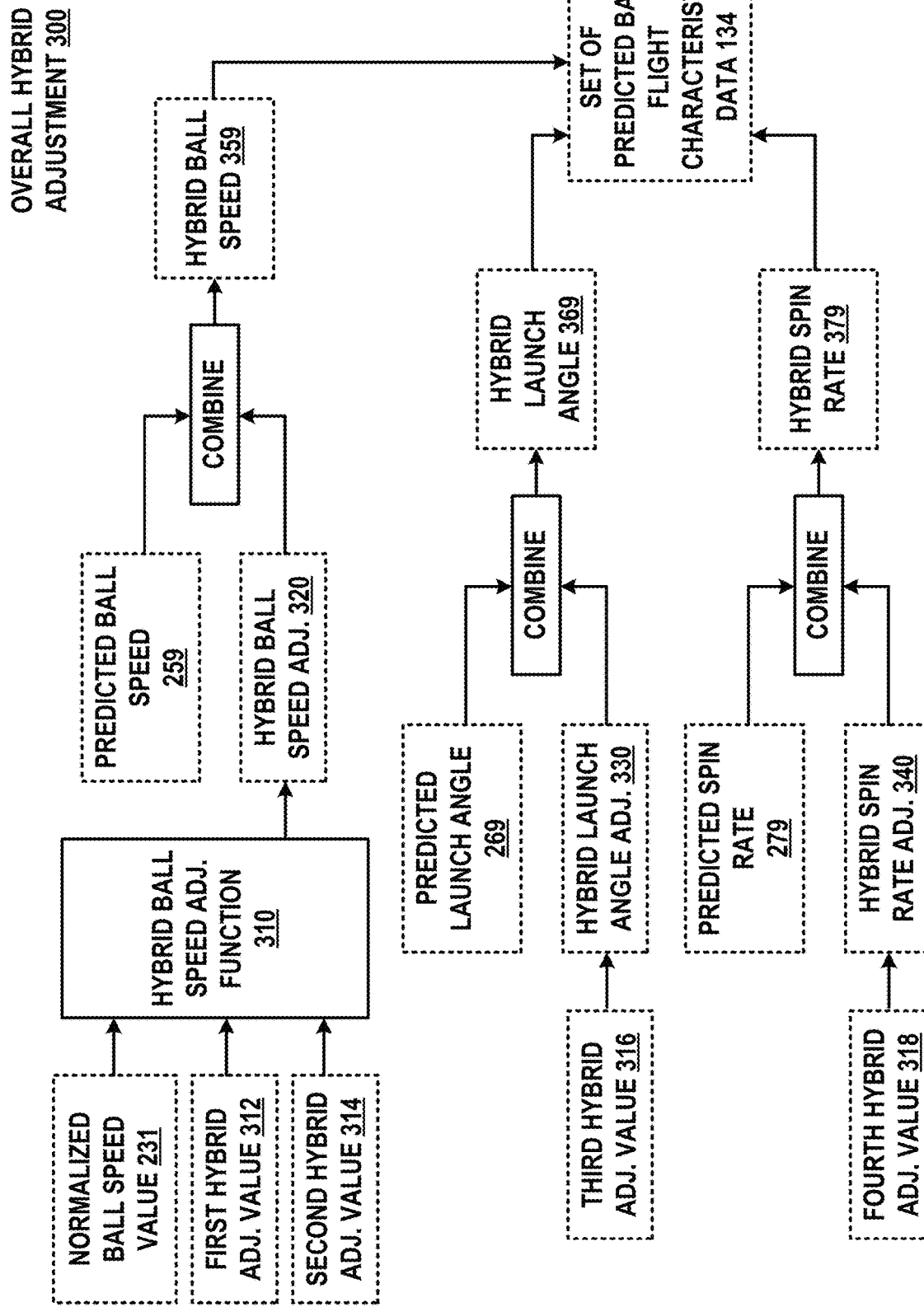
FIG. 11A is an illustration showing an overall hybrid adjustment for adjusting the set of predicted ball flight characteristic data for a hybrid candidate club.

Referring directly to FIG. 11A, the overall hybrid adjustment 300 results in a hybrid ball speed 359, a hybrid launch angle 369 and a hybrid spin rate 379. As shown, the overall hybrid adjustment 300 includes a hybrid ball speed adjustment function 310 that accepts the normalized ball speed value 231 from the ball hit by the individual using the reference club 126 and results in a hybrid ball speed adjustment 320. In some embodiments, the hybrid ball speed adjustment function 310 involves dividing the normalized ball speed value 231 by a first hybrid adjustment value 312. If the resultant value is less than one, then the resultant value can be multiplied by a second hybrid adjustment value 314 to yield the hybrid ball speed adjustment 320. Conversely, if the resultant value is greater than one, then the hybrid ball speed adjustment 320 is equal to the second hybrid adjustment value 314. The hybrid launch angle adjustment 330 can simply include a third hybrid adjustment value 316, and the hybrid spin rate adjustment 340 can simply include a fourth hybrid adjustment value 318. To obtain the hybrid ball speed 359, the hybrid ball speed adjustment 320 can be added to or otherwise combined with the predicted ball speed 259 for the candidate loft angle 204 discussed in the previous section. Similarly, to obtain the hybrid launch angle 369, the hybrid launch angle adjustment 330 can be added to or otherwise combined with the predicted launch angle 269 for the candidate loft angle 204 discussed in the previous section; to obtain the hybrid spin rate 379, the hybrid spin rate adjustment 340 can be added to or otherwise combined with the predicted spin rate 279 for the candidate loft angle 204 discussed in the previous section. For a hybrid candidate club 202 having the candidate loft angle 204, the processor 104 can update the set of predicted ball flight characteristics 134 to reflect the hybrid ball speed 359, the hybrid launch angle 369, and the hybrid spin rate 379. The first, second, third and fourth hybrid adjustment values 312, 314, 316 and 318 can be empirically obtained and derived through observation of many test shots hit using iron and hybrid clubs of varying loft angles.

Figure 11B:
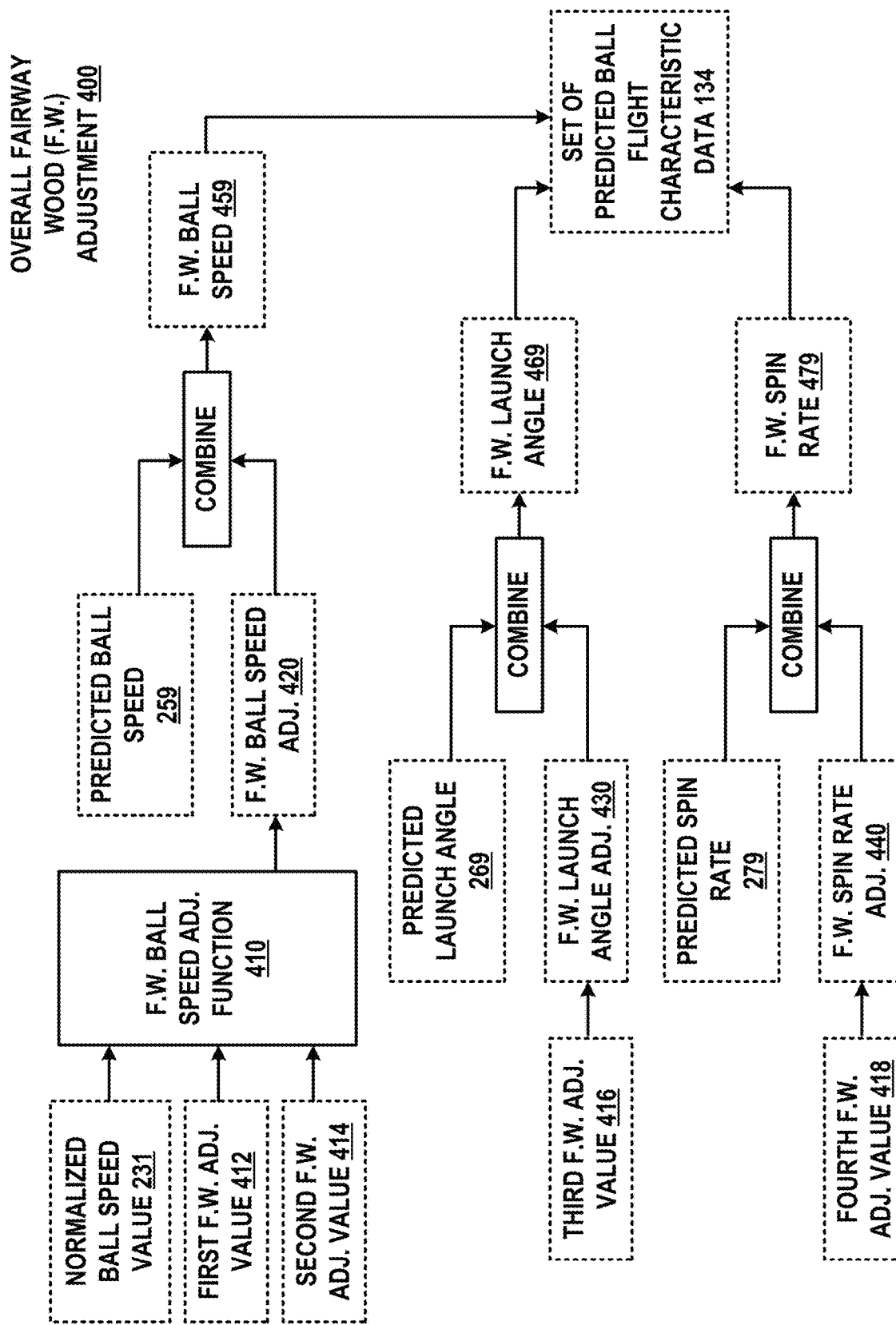
FIG. 11B is an illustration showing an overall fairway wood adjustment for adjusting the set of predicted ball flight characteristic data for a fairway wood candidate club.

Referring directly to FIG. 11B, the overall fairway wood adjustment 400 results in a fairway wood ball speed 459, a fairway wood launch angle 469 and a fairway wood spin rate 479. As shown, the overall fairway wood adjustment 400 includes a fairway wood ball speed adjustment function 410 that accepts the normalized ball speed value 231 from the ball hit by the individual using the reference club 126 and results in a fairway wood ball speed adjustment 420. In some embodiments, the fairway wood ball speed adjustment function 410 involves dividing the normalized ball speed value 231 by a first fairway wood adjustment value 412. If the resultant value is less than one, then the resultant value can be multiplied by a second fairway wood adjustment value 414 to yield the fairway wood ball speed adjustment 420. Conversely, if the resultant value is greater than one, then the fairway wood ball speed adjustment 420 is equal to the second fairway wood adjustment value 414. The fairway wood launch angle adjustment 430 can simply include a third fairway wood adjustment value 416, and the fairway wood spin rate adjustment 440 can simply include a fourth fairway wood adjustment value 418. To obtain the fairway wood ball speed 459, the fairway wood ball speed adjustment 420 can be added to or otherwise combined with the predicted ball speed 259 for the candidate loft angle 204 discussed in the previous section. Similarly, to obtain the fairway wood launch angle 469, the fairway wood launch angle adjustment 430 can be added to or otherwise combined with the predicted launch angle 269 for the candidate loft angle 204 discussed in the previous section; to obtain the fairway wood spin rate 479, the fairway wood spin rate adjustment 440 can be added to or otherwise combined with the predicted spin rate 279 for the candidate loft angle 204 discussed in the previous section. For a fairway wood candidate club 202 having the candidate loft angle 204, the processor 104 can update the set of predicted ball flight characteristics 134 to reflect the fairway wood ball speed 459, the fairway wood launch angle 469, and the fairway wood spin rate 479. The first, second, third and fourth fairway wood adjustment values 412, 414, 416 and 418 can be empirically obtained and derived through observation of many test shots hit using iron and fairway wood clubs of varying loft angles.

FIG. 12 illustrates a process flow diagram of an additional process 1100 outlining the ability of the processor 104 ability to identify an optimal combination of club types (irons, hybrids, or fairway woods) for inclusion in the set of recommended clubs 136 from the plurality of candidate clubs 202. Blocks 1201-1204 are similar to previous steps of FIGS. 9-10 previously described. Referring to block 1205 of FIG. 12 however, the processor 104 determines which club types (irons or hybrids) are unplayable for a given player by comparing the predicted ball flight characteristics 134 of low lofted irons or hybrids with the predicted ball flight characteristics 134 of an adjacent higher lofted candidate club 202. The playability or unplayability of a particular candidate club 202 is determined by a predicted apex height of the candidate club 202 relative to the predicted apex height of the reference club 126 as well as the gap between the candidate club 202 in question and an adjacent, higher lofted candidate club 202.

Relating the apex height, the processor 104 can define an apex height ratio being the apex height of a candidate club 202 divided by the apex height of the the reference club 126. The apex height ratio can express the apex height of the candidate club 202 in question as a percentage of the reference club 126 apex height. The processor 104 can further define an apex height playability threshold that can be used to determine the playability of any given club in the set of recommended clubs 136. Any candidate club 202 that includes an apex height ratio lower than the apex height playability threshold can be considered "unplayable."

The apex height playability threshold can range between 70% and 90%. In some embodiments, the apex height playability threshold can be between approximately 70% and 75%, between 75% and 80%, between 80% and 85%, or between 85% and 90%. In some embodiments, the apex height playability threshold can be between 70% and 80%, between 75% and 85%, or between 80% and 90%. In some embodiments, the apex height playability threshold can be approximately 75%, 76%, 77%, 78%, 79%, 80%, 81%, 82%, 83%, 84%, 85%, 86%, 87%, 88%, 89%, or 90%. In some embodiments, the processor 104 can define separate apex height playability thresholds for iron-type clubs and hybrid-type clubs within the ranges listed above. In some embodiments, the processor 104 can define an iron-type apex height playability threshold and a hybrid-type apex height playability threshold. A candidate club 202 is considered unplayable if the candidate club 202 has an apex height ratio that is below the associated apex height playability threshold.

Relating to the gap between candidate clubs 202 determining playability, the processor 104 can define a gap playability threshold. The gap playability threshold is used to determine if the gap between a particular candidate club 202 of a certain club type and an adjacent higher lofted recommended club 136 within the set of recommended clubs 136 is too small for the candidate club 202 to be playable. The gap playability threshold is defined as a maximum difference of the gap between the candidate club 202 in question and an adjacent higher lofted recommended club 136 within the set of recommended clubs 136 and the average gap between all the recommended club 136 within the set of recommended clubs 136. For example, if the gap between the candidate club 202 in question and an adjacent higher lofted recommended club 136 within the set of recommended clubs 136 is too small relative to the average gap between the recommended clubs 136 within the set of recommended clubs 136, the candidate club 202 in question can be determined unplayable. In some embodiments, the gap playability threshold can be determined by the relationship between the gaps of adjacent recommended clubs 136 and the target gap 290, rather than with respect to the average gap.

In many embodiments, the gap playability threshold can range between 2 yards and 5 yards. In some embodiments, the gap playability threshold is between approximately 2 yards and 2.2 yards, between 2.2 yards and 2.4 yards, between 2.4 yards and 2.6 yards, between 2.6 yards and 2.8 yards, between 2.8 yards and 3 yards, between 3 yards and 3.2 yards, between 3.2 yards and 3.4 yards, between 3.4 yards and 3.6 yards, between 3.6 yards and 3.8 yards, between 3.8 yards and 4 yards, between 4 yards and 4.2 yards, between 4.2 yards and 4.4 yards, between 4.4 yards and 4.6 yards, between 4.6 yards and 4.8 yards, or between 4.8 yards and 5 yards. In some embodiments, the gap playability threshold is between 2 yards and 3 yards, between 2.25 yards and 3.25 yards, between 2.5 yards and 3.5 yards, between 2.75 yards and 3.75 yards, between 3 yards and 4 yards, between 3.25 yards and 4.25 yards, between 3.5 yards and 4.5 yards, between 3.75 yards and 4.75 yards, or between 4 yards and 5 yards. In some embodiments, the gap playability threshold can be approximately 2 yards, 2.25 yards, 2.5 yards, 2.75 yards, 3 yards, 3.5 yards, 3.75 yards, or 4 yards. In some embodiments, the processor 104 can define separate gap playability thresholds for iron-type clubs and hybrid-type clubs within the ranges listed above. As such, in some embodiments, the processor 104 can define an iron-type gap playability threshold and a hybrid-type gap playability threshold. If the difference in the gap between a given candidate club 202 of a specific type and the adjacent higher lofted recommended club 136 within the set of recommended clubs 136 and the average gap between all the recommended clubs 136 within the set of recommended clubs 136 is greater than the gap playability threshold, the candidate club 202 is considered unplayable.

Referring to block 1206, the processor 104 can evaluate such conditions in which an iron candidate club 202 is considered unplayable and can identify a hybrid-type candidate club 202 from the plurality of candidate clubs 202 to replace the unplayable iron candidate club 202 for inclusion in the set of recommended clubs 136. The hybrid-type candidate club 202 that is selected for inclusion in the set of recommended clubs 136 can have a loft angle that results in a desirable gap between the hybrid-type candidate club 202 and an adjacent iron recommended club 136 of the set of recommended clubs 136. Similarly, the processor 104 can evaluate such conditions in which a hybrid-type candidate club 202 is considered unplayable and can identify a fairway wood-type candidate club 202 to replace the unplayable hybrid-type candidate club 202 for inclusion in the set of recommended clubs 136. The fairway wood-type candidate club 202 that is selected for inclusion in the set of recommended clubs 136 can have a loft angle that results in a desirable gap between the fairway wood-type candidate club 202 and an adjacent hybrid-type recommended club 136 of the set of recommended clubs 136.

The processor 104 is non-limiting and additional components would be appreciated by those of ordinary skill in the art. In some embodiments, for example, the processor 104 is in operable communication with a portable device, which may correspond to an individual golfer or fitter. The portable device may include a smartphone, laptop, tablet, or other portable device that may be used to execute a user interface and to access data associated with the set of reference ball flight characteristics 130 or predicted ball flight characteristics 134 described herein, receive information indicative of one or more recommended clubs 136 of the set of recommended clubs 136, and other feedback information after an individual is evaluated with the processor 104. In addition, although not depicted, the processor 104 may leverage data from external devices, such as professional golfer shot information, club information, and other forms of information which may be used to tailor general ball flight characteristic trends, or modify functionality described herein.

The processor 104 is non-limiting and additional components would be appreciated by those of ordinary skill in the art. In some embodiments, for example, the processor 104 is in operable communication with a portable device, which may correspond to an individual golfer or fitter. The portable device may include a smartphone, laptop, tablet, or other portable device that may be used to execute a user interface and to access data associated with the set of reference ball flight characteristics 130 or predicted ball flight characteristics 134 described herein, receive information indicative of one or more recommended clubs 136 of the set of recommended clubs 136, and other feedback information after an individual is evaluated with the processor 104. In addition, although not depicted, the processor 104 may leverage data from external devices, such as professional golfer shot information, club information, and other forms of information which may be used to tailor general ball flight characteristic trends, or modify functionality described herein.

EXAMPLES

Example 1

The standard error of gaps between club carry distance in an exemplary predicted club set was compared to the standard error of gaps between club carry distance in a control golf set for a particular player. For the control golf club set, the player hit a plurality of shots for each club in a golf club set comprising irons with standard loft angles (i.e., 25-58 degrees). The exemplary predicted club set was established from the player's 7-iron ball flight characteristics alone using the method described above. Table 1 shows the carry distance for the clubs in the exemplary predicted set as well as the clubs in the control set. Table 1 also shows the gap distances for both the exemplary predicted set and the control set.

As shown in Table 1, the greatest error between the control club set and the exemplary predicted club set was only 3.0% when comparing the carry distance of each club. The greatest error between the control club set and the exemplary predicted club set was only 1.8% when comparing carry gap distances between each club. The relatively low discrepancy between the predicted club set and the measured control club set indicates an effective predictive model. Specifically, the low error indicates the software can accurately predict the carry distance and gap distance of clubs in a standard golf club set when provided with only the 7-iron swing characteristics of a given player.

TABLE 1

Control Set vs. Exemplary Predicted Set

| Club | Control Carry Distance | Predicted Carry Distance | % Error | Control Gap | Predicted Gap | % Error |
|---|---|---|---|---|---|---|
| 3i | 238.0 | 241 | 3.0 | — | — | — |
| 4i | 227.0 | 228.9 | 1.9 | 11.0 | 12.1 | 1.1 |
| 5i | 215.3 | 215.4 | 0.1 | 11.7 | 13.5 | 1.8 |
| 6i | 202.6 | 202.4 | −0.2 | 12.8 | 13 | 0.2 |
| 7i | 189.4 | 188.7 | −0.7 | 13.1 | 13.7 | 0.6 |
| 8i | 175.2 | 173.5 | −1.7 | 14.2 | 15.2 | 1.0 |
| 9i | 160.1 | 158.5 | −1.6 | 15.1 | 15 | −0.1 |
| PW | 145.1 | 144.6 | −0.5 | 15.0 | 13.9 | −1.1 |

Example 2

In one example, a player exhibited 7-iron swing characteristics including a ball speed average of 120 mph, a 16 deg launch angle, and spin rate of 6,500 rpm. The variation in predicted gap distances using the present predictive model was compared between a standard set and a custom gapped set. In the standard set, the candidate loft angles were selected based on the standard commercially available loft angles for each club. In other words, the standard set reflects the gap distances the player would have without using the system to recommend an optimized set. The custom gapped set included a recommended combination of candidate clubs that produced optimal gapping.

The carry distance for each club in the player standard set and custom gapped set as well as the gap distances between each club in the player standard set and custom gapped set are displayed below in Tables 2A and 2B. The predicted average carry distance for each club in the custom gapped set and player standard set as well as the gap distances between each club for the 7 iron to long iron clubs are displayed below in Table 2A. The target gap distance for the 7 iron to long iron range for the custom gapped set was 12.5 yards.

TABLE 2A

7i to long iron

| Club Type | Standard Club Loft (degrees) | Standard Carry Distance (yds) | Custom Club Loft (degrees) | Custom Carry Distance (yds) | Target Gap (yds) | Standard Gap (yds) | Custom Gap (yds) |
|---|---|---|---|---|---|---|---|
| 3i | 19.0 | 220.0 | — | — | — | — | — |
| 4i | 22.0 | 210.3 | — | — | 12.5 | 9.7 | — |
| 5i | 25.0 | 197.7 | 26 | 197.4 | 12.5 | 12.6 | — |
| 6i | 31.5 | 184.9 | 29.5 | 184.6 | 12.5 | 12.8 | 12.8 |
| 7i | 35.0 | 172.4 | 33.0 | 172.1 | 12.5 | 12.5 | 12.5 |
| | | | | | Average | 11.9 | 12.6 |
| | | | | | Std Dev | 1.47 | 0.21 |

The standard deviation of gap distances for the 7 iron to long iron clubs in the custom gapped golf club set was 0.21, which is 1.26 yards lower than the standard deviation of gap distances in the player standard golf club set over the same range of clubs (a decrease in variance of 85.7%).

The predicted average carry distance for each club in the player standard set and custom gapped set as well as the gap distances between each club for the wedges to 7 iron clubs are displayed below in Table 2B. The target gap distance for wedge to 7 iron range for the custom gapped set was 12 yards.

TABLE 2B wedges to 7i

| Club Type | Standard Club Loft (degrees) | Standard Carry Distance (yds) | Custom Club Loft (degrees) | Custom Carry Distance (yds) | Target Gap (yds) | Standard Gap (yds) | Custom Gap (yds) |
|---|---|---|---|---|---|---|---|
| 8i | 37.0 | 159.1 | 36.5 | 160.4 | 12 | 13.3 | 11.7 |
| 9i | 41.0 | 146.4 | 40.5 | 147.7 | 12 | 12.7 | 12.7 |
| PW | 45.0 | 134.4 | 44.5 | 135.6 | 12 | 12 | 12.1 |
| UW | 50.0 | 119.6 | 48.5 | 123.7 | 12 | 14.8 | 11.9 |
| SW | — | — | 52.5 | 113.1 | 12 | — | 11.4 |
| | | | | | Average | 13.2 | 12.0 |
| | | | | | Std Dev | 1.19 | 0.49 |

The standard deviation of gap distances for the wedges to 7 iron clubs in the custom gapped golf club set was 0.49, which is 0.70 yards lower than the standard deviation of gap distances in the player standard golf club set (a decrease in variance of 58.8%).

As established in Example 1, the predictive model described herein provides a highly accurate prediction of a golf club set based on a given player's reference club characteristics. As illustrated in the above tables, the system is able to produce a recommended set of clubs that achieves significantly more consistent gapping.

Example 3

In another example, a player exhibited 7-iron swing characteristics including a relatively slow ball speed average of 113.2 mph, an 18 deg launch angle, and spin rate of 6,300 rpm. The variation in predicted gap distances using the present predictive model was compared between a standard set and a custom gapped set. In the standard set, the candidate loft angles were selected based on the standard commercially available loft angles for each club. In other words, the standard set reflects the gap distances the player would have without using the system to recommend an optimized set. The custom gapped set included a recommended combination of candidate clubs that produced optimal gapping.

The carry distance for each club in the player standard set and custom gapped set as well as the gap distances between each club in the player standard set and custom gapped set are displayed below in Tables 3A and 3B. The predicted average carry distance for each club in the custom gapped set and player standard set as well as the gap distances between each club for the 7 iron to long iron clubs are displayed below in Table 3A.

TABLE 3A

7i to long iron

| Club Type | Standard Set Lofts (degrees) | Slow Ball Speed Standard Carry Distance (yds) | Custom Set Lofts (degrees) | Custom Carry Distance (yds) | Target Gap (yds) | Slow Ball Speed Standard Gap (yds) | Custom Gap (yds) |
|---|---|---|---|---|---|---|---|
| 4i | 20.5 | 185 | — | — | — | — | — |
| 5i | 23.5 | 176.6 | 22 | 181.2 | 13.1 | 8.4 | — |
| 6i | 26.5 | 167.7 | 26 | 169.5 | 13.1 | 8.9 | 11.7 |
| 7i | 28.5 | 156.3 | 30 | 156.5 | 13.1 | 11.4 | 13.0 |
| | | | | | Average | 9.6 | 12.4 |
| | | | | | Std Dev | 1.31 | 0.65 |

The standard deviation of gap distances for the 7 iron to long iron clubs in the custom gapped golf club set was 0.65, which is 0.66 yards lower than the standard deviation of gap distances in the player standard golf club set (a decrease in variance of 50.4%).

The predicted average carry distance for each club in the player standard set and custom gapped set as well as the gap distances between each club for the wedges to 7 iron clubs are displayed below in Table 3B.

TABLE 3B

Wedges to 7i

| Club Type | Standard Set Lofts (degrees) | Slow Ball Speed Standard Carry Distance (yds) | Custom Set Lofts (degrees) | Custom Carry Distance (yds) | Target Gap (yds) | Slow Ball Speed Standard Gap (yds) | Custom Gap (yds) |
|---|---|---|---|---|---|---|---|
| 8i | 34.5 | 143.0 | 33.5 | 146.0 | 11 | 13.3 | 10.5 |
| 9i | 39.5 | 129.7 | 37.5 | 135.0 | 11 | 13.3 | 11.0 |
| PW | 44.5 | 116.3 | 41 | 124.6 | 11 | 13.4 | 10.4 |
| UW | 49.5 | 102.0 | 45.5 | 113.8 | 11 | 14.3 | 10.8 |
| SW | 54.0 | 89.3 | 49.5 | 102.5 | 11 | 12.7 | 11.3 |
| LW | 58.0 | 77.7 | 53.5 | 91.2 | 11 | 11.6 | 11.3 |
| LW2 | — | — | 58.0 | 78.2 | 11 | — | 13.0 |
| | | | | | Average | 13.1 | 11.2 |
| | | | | | Std Dev | 0.90 | 0.87 |

The standard deviation of gap distances for the wedges to 7 iron clubs in the custom gapped golf club set was 0.87, which is 0.03 yards lower than the standard deviation of gap distances in the player standard golf club set (a decrease in variance of 3.3%).

As established in Example 1, the predictive model described herein provides a highly accurate prediction of a golf club set based on a given player's reference club characteristics. As illustrated in the above tables, the system is able to produce a recommended set of clubs that achieves significantly more consistent gapping.

Example 4

In another example, a player exhibited 7-iron swing characteristics including a relatively fast ball speed average of 132.1 mph, a 15.5 deg launch angle, and spin rate of 6,800 rpm. The variation in predicted gap distances using the present predictive model was compared between a standard set and a custom gapped set. In the standard set, the candidate loft angles were selected based on the standard commercially available loft angles for each club. In other words, the standard set reflects the gap distances the player would have without using the system to recommend an optimized set. The custom gapped set included a recommended combination of candidate clubs that produced optimal gapping.

The carry distance for each club in the player standard set and custom gapped set as well as the gap distances between each club in the standard set and custom gapped set are displayed below in Tables 4A and 4B. The predicted average carry distance for each club in the player standard set and custom gapped set as well as the gap distances between each club for the 7 iron to long iron clubs are displayed below in Table 4A.

TABLE 4A

7i to Long Iron

| Club Type | Standard Set Lofts (degrees) | Fast Ball Speed Standard Carry Distance (yds) | Custom Set Lofts (degrees) | Custom Carry Distance (yds) | Target Gap (yds) | Fast Ball Speed Standard Gap (yds) | Custom Gap (yds) |
|---|---|---|---|---|---|---|---|
| 3i | 20.0 | 250.0 | — | — | — | — | — |
| 4i | 23.5 | 236.5 | 24.5 | 232.5 | 14.1 | 13.5 | — |
| 5i | 27.0 | 220.7 | 27.5 | 218.8 | 14.1 | 15.8 | 13.7 |
| 6i | 30.5 | 205.1 | 30.5 | 205.6 | 14.1 | 15.6 | 13.2 |
| 7i | 34.0 | 190.6 | 34 | 191.1 | 14.1 | 14.5 | 14.5 |
| | | | | | Average | 14.9 | 13.8 |
| | | | | | Std Dev | 1.07 | 0.66 |

The standard deviation of gap distances for the 7 iron to long iron clubs in the custom gapped golf club set was 0.66, which is 0.51 yards lower than the standard deviation of gap distances in the player standard golf club set (a decrease in variance of 47.7%).

The predicted average carry distance for each club in the player standard set and custom gapped set as well as the gap distances between each club for the wedges to 7 iron clubs are displayed below in Table 4B.

TABLE 4B wedges to 7i

| Club Type | Standard Set Lofts (degrees) | Fast Ball Speed Standard Carry Distance (yds) | Custom Set Lofts (degrees) | Custom Carry Distance (yds) | Target Gap (yds) | Fast Ball Speed Standard Gap (yds) | Custom Gap (yds) |
|---|---|---|---|---|---|---|---|
| 8i | 38.0 | 175.0 | 37.5 | 177.4 | 13 | 15.6 | 13.7 |
| 9i | 42.0 | 160.7 | 41 | 164.7 | 13 | 14.3 | 12.7 |
| PW | 46.0 | 148.1 | 45 | 151.7 | 13 | 12.6 | 13.0 |
| UW | — | — | 49.5 | 138.4 | 13 | — | 13.3 |
| SW | — | — | 54 | 126.1 | 13 | — | 12.3 |
| | | | | | Average | 14.2 | 13.0 |
| | | | | | Std Dev | 1.50 | 0.54 |

The standard deviation of gap distances for the wedges to 7 iron clubs in the custom gapped golf club set was 0.54, which is 0.96 yards lower than the standard deviation of gap distances in the player standard golf club set (a decrease in variance of 64.0%).

As established in Example 1, the predictive model described herein provides a highly accurate prediction of a golf club set based on a given player's reference club characteristics. As illustrated in the above tables, the system is able to produce a recommended set of clubs that achieves significantly more consistent gapping.

Example 5

In another example, a golfer exhibited a 90 mph ball speed, 17° launch angle and 5000 rpm spin rate with a 29-degree 7-iron used as the reference club. The system can determine the set of predicted ball flight characteristic data for the golfer for a full iron set (4i through lob wedge) using the methods outlined above with respect to FIGS. 3-6. Table 5A below shows predicted ball flight characteristic data for the golfer. The system produced a functional full predicted set makeup for the golfer.

TABLE 5A predicted ball flight characteristic data

| Club | Carry Dist. (yards) | Total Dist. (yards) | Apex Height (yards) | Gap (yards) |
|---|---|---|---|---|
| 4i | 127.9 | 157.8 | 10.8 | — |
| 5i | 126.1 | 151.5 | 12.1 | 1.8 |

TABLE 5A-continued predicted ball flight characteristic data

| Club | Carry Dist. (yards) | Total Dist. (yards) | Apex Height (yards) | Gap (yards) |
|---|---|---|---|---|
| 6i | 122.0 | 141.8 | 13.3 | 4.1 |
| 7i | 115.7 | 131.5 | 14.0 | 6.3 |
| 8i | 107.7 | 119.7 | 14.4 | 8.0 |
| 9i | 99.7 | 109.3 | 14.4 | 8.0 |
| PW | 91.5 | 99.2 | 14.1 | 8.2 |
| 45° | 80.1 | 86.8 | 12.9 | 11.4 |
| 50° | 67.5 | 72.9 | 11.7 | 12.6 |
| 54° | 57.1 | 61.2 | 11.1 | 10.4 |
| 58° | 46.8 | 49.7 | 10.7 | 10.3 |

The system was configured to determine the optimal combination of iron-type, hybrid-type, and fairway wood-type clubs. The system determined the lowest-lofted playable iron. In the present example, the set defined a gap playability threshold of 3.5 yards with respect to the target gap and an apex height playability threshold of 85% with respect to the apex height of the reference club (in this case, the 7-iron). In the present example, the target gap was determined to be 8.8 yards. An unplayable gap in this situation was therefore any gap less than 4.3 yards. As evidenced by Table 5A, the gap between the 5-iron and the 6-iron was 4.1 yards, and therefore the 5-iron was deemed unplayable for this particular player. In this example, the minimum playable apex height was 11.9 yards (85% of the 7-iron apex height). As evidenced by Table 5A, the apex height of the 4-iron (10.8 yards) was below the apex height playability threshold, and therefore the 4-iron was deemed unplayable for this particular player.

The next step was determining which fairways and hybrids should be selected to fill out the remainder of the golfer's bag. After disqualifying the 4-iron and the 5-iron, the golfer was left with 11-clubs: a driver, putter and 9 irons (6-iron through lob wedge). In this example, the golfer specified a desired longest fairway wood (a 3-wood in this case). The set therefore required two clubs to bridge the gap between the golfer's 3-wood and 6-iron. The system generated predictions to create equal total distance gaps between the golfer's longest iron (the 6-iron) and the longest fairway wood (the 3-wood). The system generated the predicted distances for the hybrid(s) and fairway wood(s) using the same method as that used for predicting the distances of the irons, but for the addition of the adjustment factors for fairway wood-type clubs and hybrid-type clubs in the above section "Hybrid and Fairway Wood Tradeoffs". In particular, the adjustment factors for hybrid conversion can include the hybrid ball speed adjustment, the hybrid launch angle adjustment, and the hybrid spin rate adjustment. Similarly, the adjustment factors for fairway wood conversion can include the fairway wood ball speed adjustment, the fairway wood launch angle adjustment, and the fairway wood spin rate adjustment.

Based on the gap between the total distance of the 3-wood and the total distance of the 6-iron, the desired hybrid and fairway wood total gapping was 12.1 yards between each club. In one example implementation, the processor 104 can be configured to divide the number of fairways and hybrids evenly, with more fairway woods in the case of an odd number. In this example, the processor 104 recommended 1 hybrid-type clubs and 2 fairway wood-type clubs. The processor 104 iterated through loft options for all possible candidate clubs to generate a solution that provides gaps between the 3-wood and 6-iron that are as close as possible to the 12.1-yard target gap. The following gapping solution shown in Table 5B can be found for the example player. In the "Gap" column, total distances are used for the gaps between the fairway woods, hybrids, and lowest-lofted iron, and such gaps are designated by the letter "T."

TABLE 5B

| | Gapping solutions | | | | |
|---|---|---|---|---|---|
| Club | Loft Angle (°) | Carry Dist. (yards) | Total Dist. (yards) | Apex Height (yards) | Gap (yards) |
| 3W | 14.5 | 146.1 | 178.1 | 11.3 | — |
| 7W | 20.5 | 144.1 | 165.5 | 15.1 | 12.6 T |
| 5H | 24 | 132.1 | 153.7 | 13.5 | 11.8 T |
| 6i | 25.5 | 122 | 141.8 | 13.3 | 11.9 T |
| 7i | 29 | 115.7 | 131.5 | 14 | 6.3 |
| 8i | 33 | 107.7 | 119.7 | 14.4 | 8.0 |
| 9i | 37 | 99.7 | 109.3 | 14.4 | 8.0 |
| PW | 41 | 91.5 | 99.2 | 14.1 | 8.2 |
| 45° | 45.5 | 80.1 | 86.8 | 12.9 | 11.4 |
| 50° | 50 | 67.5 | 72.9 | 11.7 | 12.6 |

TABLE 5B-continued

| | Gapping solutions | | | | |
|---|---|---|---|---|---|
| Club | Loft Angle (°) | Carry Dist. (yards) | Total Dist. (yards) | Apex Height (yards) | Gap (yards) |
| 54° | 54 | 57.1 | 61.2 | 11.1 | 10.4 |
| 58° | 58 | 46.8 | 49.7 | 10.7 | 10.3 |

For the player in this particular example, the processor 104 recommends a 3-wood, a 7-wood, a 5-hybrid and a 6-iron thru 58° lob wedge. Each golfer will have their own unique solution with different recommended clubs and different predicted ball flights.

Computing Device

Figure 15:
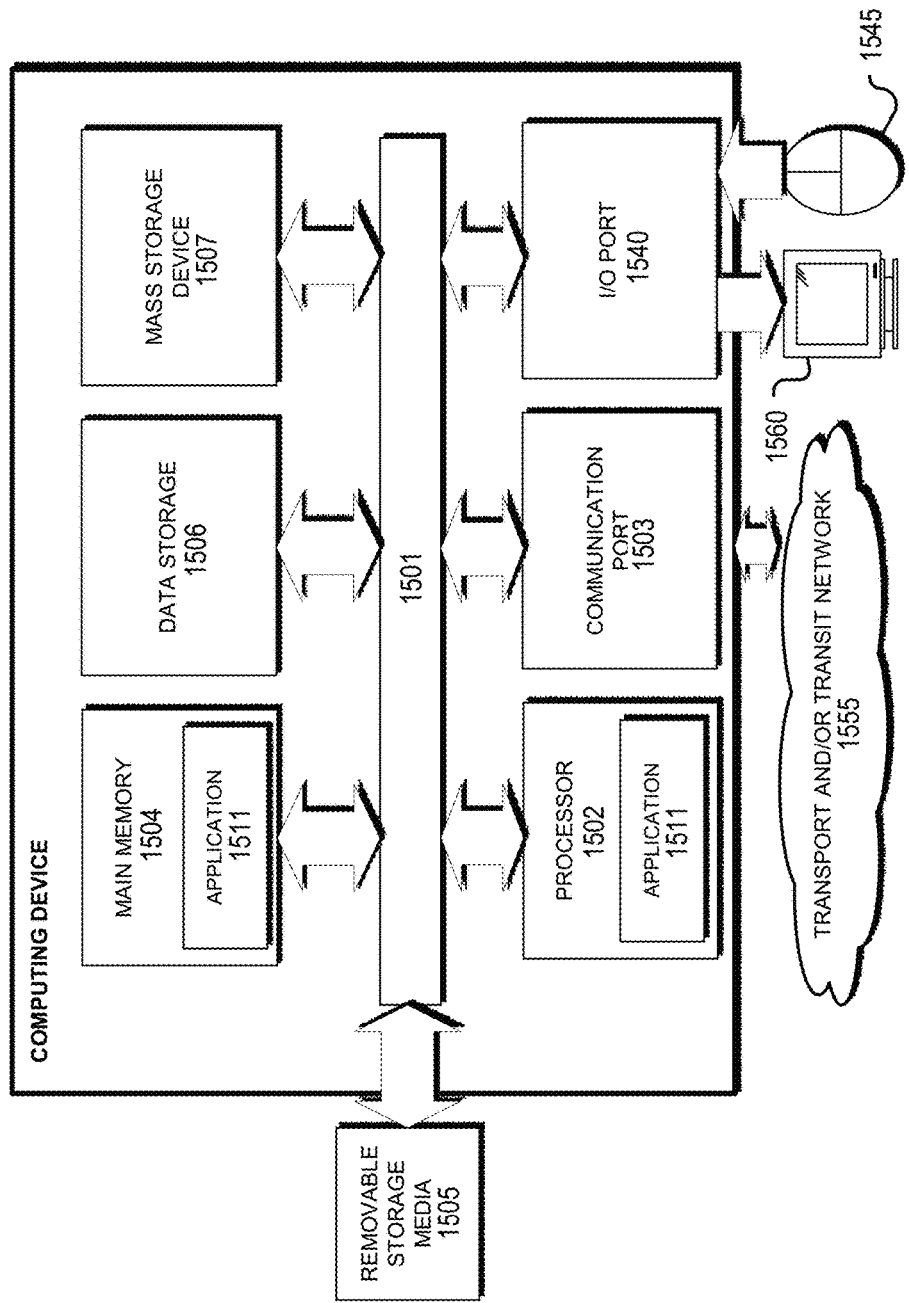
FIG. 15 is an exemplary computing system that may be implemented to execute functionality described herein.

Referring to FIG. 15, a computing device 1500 is illustrated which may take the place of the computing device 140 and be configured, via one or more of an application 1511 or computer-executable instructions, to execute functionality described herein. More particularly, in some embodiments, aspects of the predictive methods herein may be translated to software or machine-level code, which may be installed to and/or executed by the computing device 1500 such that the computing device 1500 is configured to execute functionality described herein. It is contemplated that the computing device 1500 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1500 may include various hardware components, such as a processor 1502, a main memory 1504 (e.g., a system memory), and a system bus 1501 that couples various components of the computing device 1500 to the processor 1502. The system bus 1501 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1500 may further include a variety of memory devices and computer-readable media 1507 that includes removable/non-removable media and volatile/nonvolatile media and/or tangible media, but excludes transitory propagated signals. Computer-readable media 1507 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1500.

Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1504 includes computer storage media in the form of volatile/nonvolatile memory such as read only memory (ROM) and random access memory (RAM). A basic input/output system (BIOS), containing the basic routines that help to transfer information between elements within the computing device 1500 (e.g., during start-up) is typically stored in ROM. RAM typically contains data and/or program modules that are immediately accessible to and/or presently being operated on by processor 1502. Further, data storage 1506 in the form of Read-Only Memory (ROM) or otherwise may store an operating system, application programs, and other program modules and program data.

The data storage 1506 may also include other removable/non-removable, volatile/nonvolatile computer storage media. For example, the data storage 1506 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1500.

A user may enter commands and information through a user interface 1540 (displayed via a monitor 1560) by engaging input devices 1545 such as a tablet, electronic digitizer, a microphone, keyboard, and/or pointing device, commonly referred to as mouse, trackball or touch pad. Other input devices 1545 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1545 are in operative connection to the processor 1502 and may be coupled to the system bus 1501, but may be connected by other interface and bus structures, such as a parallel port, game port or a universal serial bus (USB). The monitor 1560 or other type of display device may also be connected to the system bus 1501. The monitor 1560 may also be integrated with a touch-screen panel or the like.

The computing device 1500 may be implemented in a networked or cloud-computing environment using logical connections of a network interface 1503 to one or more remote devices, such as a remote computer. The remote computer may be a personal computer, a server, a router, a network PC, a peer device or other common network node, and typically includes many or all of the elements described above relative to the computing device 1500. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1500 may be connected to a public and/or private network through the network interface 1503. In such embodiments, a modem or other means for establishing communications over the network is connected to the system bus 1501 via the network interface 1503 or other appropriate mechanism. A wireless networking component including an interface and antenna may be coupled through a suitable device such as an access point or peer computer to a network. In a networked environment, program modules depicted relative to the computing device 1500, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1502, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Various features and advantages of the disclosure are set forth herein.

CLAUSES

Clause 1: A system that improves computed prediction of loft angle combinations for optimal golf club gapping, comprising: a tracking device that generates a first dataset unique to an individual for each of a plurality of golf shots struck by the individual using a reference golf club comprising a reference loft angle, the first dataset including reference ball flight characteristics associated with movement of a golf ball; and a processor in operable communication with the tracking device and configured to transform the first dataset to a second dataset defining predicted ball flight characteristics for one or more candidate golf clubs, wherein the processor: normalizes the reference ball flight characteristics defined by the first dataset as derived from the plurality of golf shots, generates a set of predicted ball flight characteristics for a candidate loft angle by input of the reference ball flight characteristics as normalized and the candidate loft angle to a predetermined ball flight trend function configured to predict changes in ball flight based upon predetermined correlations between loft angle and the ball flight characteristics, and adjusts the set of predicted ball flight characteristics by application of output from one or more adjustment computations that adjust for deviation of one or more of the reference ball flight characteristics of the individual from a predetermined threshold, the one or more adjustment computations improving computed-prediction accuracy by accounting for player-specific discrepancies.

Clause 2: The system of clause 1, wherein the one or more adjustment computations include a ball speed adjustment component and a spin rate adjustment component that account for an effect on each predicted ball flight characteristic due to a deviation from a baseline ball speed value for the reference club and a baseline spin rate value for the reference club, respectively.

Clause 3: The system of clause 2, wherein the processor is further configured to: determine one or more individual-specific slope values descriptive of an expected change in a value of a predicted ball flight characteristic of the set of predicted ball flight characteristics per degree change in loft angle based on the ball speed adjustment component or the spin rate adjustment component; and combine the one or more individual-specific slope values into a total individual-specific slope value for the predicted ball flight characteristic of the set of predicted ball flight characteristics, the total individual-specific slope value being descriptive of an expected change in value of the predicted ball flight characteristic per degree change in loft angle, wherein the total individual-specific slope value includes at least one of a predicted ball speed slope, a predicted launch angle slope, and a predicted spin rate slope.

Clause 4: The system of clause 3, wherein the processor is further configured to: determine a value of a predicted ball flight characteristic of the set of predicted ball flight characteristics using the total individual-specific slope value and a difference in loft angle between the reference loft angle and the candidate loft angle; wherein the set of predicted ball flight characteristics include at least one of a predicted ball speed, a predicted launch angle, and a predicted spin rate Clause 5: The system of clause 2, wherein the processor is further configured to: select a set of adjustment parameters for the ball speed adjustment component of the one or more adjustment computations for a predicted ball flight characteristic of the set of predicted ball flight characteristics based on the candidate loft angle; and determine a first individual-specific slope value of a set of individual-specific slope values for the predicted ball flight characteristic of the set of predicted ball flight characteristics based on the candidate loft angle, the ball speed adjustment component, and the set of adjustment parameters of the ball speed adjustment component for the predicted ball flight characteristic.

Clause 6: The system of clause 2, wherein the processor is further configured to: select a set of adjustment parameters for the spin rate adjustment component of the one or more adjustment computations for a predicted ball flight characteristic of the set of predicted ball flight characteristics based on the candidate loft angle; and determine a second individual-specific slope value of a set of individual-specific slope values for the predicted ball flight characteristic of the set of predicted ball flight characteristics based on the candidate loft angle, the spin rate adjustment component, and the set of adjustment parameters of the spin rate adjustment component for the predicted ball flight characteristic.

Clause 7: The system of clause 1, wherein as configured the processor further: generates the second dataset to define a plurality of sets of predicted ball flight characteristics for a plurality of candidate golf clubs associated with a plurality of candidate loft angles, each set of predicted ball flight characteristics of the plurality of sets of predicted ball flight characteristics corresponding to a candidate loft angle of the plurality of candidate loft angles and derived from inputting the reference ball flight characteristics as normalized and the candidate loft angle to the predetermined trend function, and adjusts the plurality of sets of predicted ball flight characteristics by application of output from one or more adjustment computations that adjust for deviation of one or more of the reference ball flight characteristics of the individual from a predetermined threshold, the one or more adjustment computations increasing accuracy by accounting for player-specific discrepancies.

Clause 8: The system of clause 7, wherein the processor is further configured to: determine a combination from the plurality of candidate golf clubs with optimal gapping by an evaluation of predicted ball flight characteristics as adjusted for each candidate loft angle available for each candidate golf club.

Clause 9: The system of clause 7, wherein the processor is further configured to: determine a predicted ball flight distance for each candidate loft angle of the plurality of candidate loft angles, and select a candidate loft angle for each of the plurality of candidate golf clubs that maximizes consistency of predicted distance values of the plurality of candidate golf clubs.

Clause 10: The system of clause 1, wherein the first dataset includes a set of first data structures representing ball flight metrics from movement of the golf ball via the reference golf club as generated by the tracking device and the second dataset includes a second set of data structures comprising pseudo-ball flight metrics predicted for a candidate golf club having a candidate loft angle different from the reference loft angle.

Clause 11: The system of clause 10, wherein the processor is further configured to: display a visual representation of the pseudo-ball flight metrics predicted for the golf club having the candidate loft angle different from the reference loft angle, the visual representation illustrating application of the output from the one or more adjustment computations that adjust for deviation of one or more of the reference ball flight characteristics of the individual such that the visual representation more accurately represents predicted ball flight characteristics specific to the individual.

Clause 12: A system that improves computed prediction of loft angle combinations for optimal golf club gapping, comprising: a tracking device that generates a first dataset unique to an individual for each of a plurality of golf shots struck by the individual using a reference golf club comprising a reference loft angle, the first dataset including a set of reference ball flight characteristics associated with movement of a golf ball; and a processor in operable communication with the tracking device and configured to transform the first dataset to a second dataset defining predicted ball flight characteristics for one or more candidate golf clubs, wherein the processor: (a) generates a predicted ball flight characteristic for a candidate club by execution of a predetermined ball flight trend function configured to predict changes in ball flight based upon predetermined correlations between loft angle and general ball flight characteristics, wherein the processor: derives, using a slope function including an overall trend component of the predetermined ball flight trend function and using a reference ball flight characteristic of the set of reference ball flight characteristics, a slope value indicative of a rate of change of a predicted ball flight characteristic per degree change in loft angle; and determines, based on the slope value for the predicted ball flight characteristic and based on a difference between a candidate loft angle of the candidate club and the reference loft angle, a value of the predicted ball flight characteristic that the individual is predicted to produce with the candidate club.

Clause 13: The system of clause 12, wherein the processor further: executes one or more adjustment computations that evaluate one or more adjustment components indicative of an adjustment to the rate of change of the predicted ball flight characteristic per degree change in loft angle, the one or more adjustment computations incorporating the reference ball flight characteristics, the candidate loft angle and a set of adjustment parameters selected based on the candidate loft angle; and combines a result of the overall trend component as evaluated and a result of the one or more adjustment computations as evaluated resulting in the slope value for the predicted ball flight characteristic of the set of predicted ball flight characteristics to derive an adjusted predicted ball flight characteristic that accounts for anomalies unique to the individual from predetermined normal shot trends.

Clause 14: The system of clause 12, wherein the processor adjusts the predicted ball flight characteristic by application of output from an adjustment computation that adjusts for deviation of one or more of the reference ball flight characteristics of the individual from a predetermined threshold, the adjustment computation improving computed-prediction accuracy by accounting for player-specific discrepancies.

Clause 15: The system of clause 12, wherein the processor repeats step (a) to derive a plurality of predicted ball flight characteristics for the candidate club, the plurality of predicted ball flight characteristics including at least one of predicted ball spin, predicted spin rate, and predicted launch angle that the individual will strike a ball using the candidate club having the candidate club loft angle.

Clause 16: The system of clause 15, wherein the processor generates a predicted distance that the individual will strike the ball by modeling a projected trajectory of the ball using at least one of the plurality of predicted ball flight characteristics, the predicted distance accommodating predetermined gapping targets for the individual.

Clause 17: A method for improved computed prediction of loft angle combinations for optimal golf club gapping, comprising accessing, by a processor, a dataset defining reference ball flight characteristics associated with a plurality of golf club shots struck by an individual using a reference club defining a reference club loft angle; and generating, by the processor inputting the reference ball flight characteristics and a plurality of candidate club loft angles associated with a plurality of candidate clubs to a predetermined ball flight trend function, a set of predicted ball flight characteristics for each of a plurality of candidate clubs, the set of predicted ball flight characteristics defining predicted ball flight data for each candidate club, the predetermined ball flight trend function configured to predict changes in ball flight based upon predetermined correlations between loft angle and the ball flight characteristics to account for expected change in a given ball flight characteristic per degree change in loft, wherein the set of predicted ball flight characteristics for each candidate club accommodate predicted gapping between adjacent ones of the plurality of candidate clubs.

Clause 18: The method of clause 17, further comprising: adjusting by the processor at least one of the set of predicted ball flight characteristics for a candidate club by application of output from an adjustment computation that adjusts for deviation of one or more of the reference ball flight characteristics of the individual from a predetermined threshold, the adjustment computation improving computed-prediction accuracy by accounting for player-specific discrepancies Clause 19: The method of clause 17, further comprising determining by the processor a predicted distance that the individual will strike the ball by with a candidate club of the plurality of candidate clubs by modeling a projected trajectory of the ball using at least one of the set of predicted ball flight characteristics associated with the candidate club, the predicted distance accommodating predetermined gapping targets for the individual.

Clause 20: The method of clause 19, further comprising: determining by the processor a predicted distance that the individual will strike a golf ball with each candidate club leveraging the set of predicted ball flight characteristics for each candidate club; and recommending a combination of a select portion of the plurality of candidate clubs that is expected to produce predicted distances defining an average gap between predicted distances that is closest to a target gap.

The invention claimed is:

1. A system that improves computed prediction of loft angle combinations for optimal golf club gapping, comprising:
   a tracking device that generates a first dataset unique to an individual for each of a plurality of golf shots struck by the individual using a reference golf club comprising a reference loft angle, the first dataset including reference ball flight characteristics associated with movement of a golf ball; and
   a processor in operable communication with the tracking device and configured to transform the first dataset to a second dataset defining predicted ball flight characteristics for one or more candidate golf clubs, wherein the processor:
   normalizes the reference ball flight characteristics defined by the first dataset as derived from the plurality of golf shots,
   generates a set of predicted ball flight characteristics for a candidate loft angle by input of the reference ball flight characteristics as normalized and the candidate loft angle to a predetermined ball flight trend function configured to predict changes in ball flight based upon predetermined correlations between loft angle and the ball flight characteristics, and
   adjusts the set of predicted ball flight characteristics by application of output from one or more adjustment computations that adjust for deviation of one or more of the reference ball flight characteristics of the individual from a predetermined threshold, the one or more adjustment computations improving computed-prediction accuracy by accounting for player-specific discrepancies.

2. The system of claim 1, wherein the one or more adjustment computations include a ball speed adjustment component and a spin rate adjustment component that account for an effect on each predicted ball flight characteristic due to a deviation from a baseline ball speed value for the reference golf club and a baseline spin rate value for the reference golf club, respectively.

3. The system of claim 2, wherein the processor is further configured to:
   determine one or more individual-specific slope values descriptive of an expected change in a value of a predicted ball flight characteristic of the set of predicted ball flight characteristics per degree change in loft angle based on the ball speed adjustment component or the spin rate adjustment component; and
   combine the one or more individual-specific slope values into a total individual-specific slope value for the predicted ball flight characteristic of the set of predicted ball flight characteristics, the total individual-specific slope value being descriptive of an expected change in value of the predicted ball flight characteristic per degree change in loft angle,
   wherein the total individual-specific slope value includes at least one of a predicted ball speed slope, a predicted launch angle slope, and a predicted spin rate slope.

4. The system of claim 3, wherein the processor is further configured to:
   determine a value of a predicted ball flight characteristic of the set of predicted ball flight characteristics using the total individual-specific slope value and a difference in loft angle between the reference loft angle and the candidate loft angle; and
   wherein the set of predicted ball flight characteristics include at least one of a predicted ball speed, a predicted launch angle, and a predicted spin rate.

5. The system of claim 2, wherein the processor is further configured to:
   select a set of adjustment parameters for the ball speed adjustment component of the one or more adjustment computations for a predicted ball flight characteristic of the set of predicted ball flight characteristics based on the candidate loft angle; and
   determine a first individual-specific slope value of a set of individual-specific slope values for the predicted ball flight characteristic of the set of predicted ball flight characteristics based on the candidate loft angle, the ball speed adjustment component, and the set of adjustment parameters of the ball speed adjustment component for the predicted ball flight characteristic.

6. The system of claim 2, wherein the processor is further configured to:
   select a set of adjustment parameters for the spin rate adjustment component of the one or more adjustment computations for a predicted ball flight characteristic of the set of predicted ball flight characteristics based on the candidate loft angle; and
   determine a second individual-specific slope value of a set of individual-specific slope values for the predicted ball flight characteristic of the set of predicted ball flight characteristics based on the candidate loft angle, the spin rate adjustment component, and the set of adjustment parameters of the spin rate adjustment component for the predicted ball flight characteristic.

7. The system of claim 1, wherein as configured the processor further:
   generates the second dataset to define a plurality of sets of predicted ball flight characteristics for a plurality of candidate golf clubs associated with a plurality of candidate loft angles, each set of predicted ball flight characteristics of the plurality of sets of predicted ball flight characteristics corresponding to a candidate loft angle of the plurality of candidate loft angles and derived from inputting the reference ball flight characteristics as normalized and the candidate loft angle to the predetermined ball flight trend function, and
   adjusts the plurality of sets of predicted ball flight characteristics by application of output from one or more adjustment computations that adjust for deviation of one or more of the reference ball flight characteristics of the individual from a predetermined threshold, the one or more adjustment computations increasing accuracy by accounting for player-specific discrepancies.

8. The system of claim 7, wherein the processor is further configured to:
   determine a combination from the plurality of candidate golf clubs with optimal gapping by an evaluation of predicted ball flight characteristics as adjusted for each candidate loft angle available for each candidate golf club.

9. The system of claim 7, wherein the processor is further configured to:
   determine a predicted ball flight distance for each candidate loft angle of the plurality of candidate loft angles, and
   select a candidate loft angle for each of the plurality of candidate golf clubs that maximizes consistency of predicted distance values of the plurality of candidate golf clubs.

10. The system of claim 1, wherein the first dataset includes a set of first data structures representing ball flight metrics from movement of the golf ball via the reference golf club as generated by the tracking device and the second dataset includes a second set of data structures comprising pseudo-ball flight metrics predicted for a candidate golf club having a candidate loft angle different from the reference loft angle.

11. The system of claim 10, wherein the processor is further configured to:
   display a visual representation of the pseudo-ball flight metrics predicted for the candidate golf club having the candidate loft angle different from the reference loft angle, the visual representation illustrating application of the output from the one or more adjustment computations that adjust for deviation of one or more of the reference ball flight characteristics of the individual such that the visual representation more accurately represents predicted ball flight characteristics specific to the individual.

12. A system that improves computed prediction of loft angle combinations for optimal golf club gapping, comprising:
   a tracking device that generates a first dataset unique to an individual for each of a plurality of golf shots struck by the individual using a reference golf club comprising a reference loft angle, the first dataset including a set of reference ball flight characteristics associated with movement of a golf ball; and
   a processor in operable communication with the tracking device and configured to transform the first dataset to a second dataset defining predicted ball flight characteristics for one or more candidate golf clubs, wherein the processor:
   (a) generates a predicted ball flight characteristic for a candidate club by execution of a predetermined ball flight trend function configured to predict changes in ball flight based upon predetermined correlations between loft angle and general ball flight characteristics, wherein the processor:
      derives, using a slope function including an overall trend component of the predetermined ball flight trend function and using a reference ball flight characteristic of the set of reference ball flight characteristics, a slope value indicative of a rate of change of a predicted ball flight characteristic per degree change in loft angle; and
      determines, based on the slope value for the predicted ball flight characteristic and based on a difference between a candidate loft angle of the candidate club and the reference loft angle, a value of the predicted ball flight characteristic that the individual is predicted to produce with the candidate club.

13. The system of claim 12, wherein the processor further:
   executes one or more adjustment computations that evaluate one or more adjustment components indicative of an adjustment to the rate of change of the predicted ball flight characteristic per degree change in loft angle, the one or more adjustment computations incorporating the reference ball flight characteristics, the candidate loft angle and a set of adjustment parameters selected based on the candidate loft angle; and
   combines a result of the overall trend component as evaluated and a result of the one or more adjustment computations as evaluated resulting in the slope value for the predicted ball flight characteristic of the set of predicted ball flight characteristics to derive an adjusted predicted ball flight characteristic that accounts for anomalies unique to the individual from predetermined normal shot trends.

14. The system of claim 12, wherein the processor adjusts the predicted ball flight characteristic by application of output from an adjustment computation that adjusts for deviation of one or more of the reference ball flight characteristics of the individual from a predetermined threshold, the adjustment computation improving computed-prediction accuracy by accounting for player-specific discrepancies.

15. The system of claim 12, wherein the processor repeats step (a) to derive a plurality of predicted ball flight characteristics for the candidate club, the plurality of predicted ball flight characteristics including at least one of predicted ball spin, predicted spin rate, and predicted launch angle that the individual will strike a ball using the candidate club having the candidate loft angle.

16. The system of claim 15, wherein the processor generates a predicted distance that the individual will strike the ball by modeling a projected trajectory of the ball using at least one of the plurality of predicted ball flight characteristics, the predicted distance accommodating predetermined gapping targets for the individual.

17. A method for improved computed prediction of loft angle combinations for optimal golf club gapping, comprising
   accessing, by a processor, a dataset defining reference ball flight characteristics associated with a plurality of golf club shots struck by an individual using a reference club defining a reference club loft angle; and
   generating, by the processor inputting the reference ball flight characteristics and a plurality of candidate club loft angles associated with a plurality of candidate clubs to a predetermined ball flight trend function, a set of predicted ball flight characteristics for each of a plurality of candidate clubs, the set of predicted ball flight characteristics defining predicted ball flight data for each candidate club, the predetermined ball flight trend function configured to predict changes in ball flight based upon predetermined correlations between loft angle and the ball flight characteristics to account for expected change in a given ball flight characteristic per degree change in loft,
   wherein the set of predicted ball flight characteristics for each candidate club accommodate predicted gapping between adjacent ones of the plurality of candidate clubs.

18. The method of claim 17, further comprising:
   adjusting by the processor at least one of the set of predicted ball flight characteristics for a candidate club by application of output from an adjustment computation that adjusts for deviation of one or more of the reference ball flight characteristics of the individual from a predetermined threshold, the adjustment computation improving computed-prediction accuracy by accounting for player-specific discrepancies.

19. The method of claim 17, further comprising determining by the processor a predicted distance that the individual will strike a golf ball by with a candidate club of the plurality of candidate clubs by modeling a projected trajectory of the golf ball using at least one of the set of predicted ball flight characteristics associated with the candidate club, the predicted distance accommodating predetermined gapping targets for the individual.

20. The method of claim 19, further comprising:
  determining by the processor a predicted distance that the individual will strike the golf ball with each candidate club leveraging the set of predicted ball flight characteristics for each candidate club; and
  recommending a combination of a select portion of the plurality of candidate clubs that is expected to produce predicted distances defining an average gap between predicted distances that is closest to a target gap.

* * * * *